United States Patent
Pan et al.

(10) Patent No.: US 7,405,862 B2
(45) Date of Patent: Jul. 29, 2008

(54) SPATIAL LIGHT MODULATOR HAVING A CANTILEVER ANTI-STICTION MECHANISM

(75) Inventors: Shaoher X. Pan, San Jose, CA (US); Vlad Novotny, Los Gatos, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 252 days.

(21) Appl. No.: 11/366,195

(22) Filed: Mar. 1, 2006

(65) Prior Publication Data
US 2007/0206265 A1 Sep. 6, 2007

(51) Int. Cl.
*G02B 26/00* (2006.01)
*G02B 26/08* (2006.01)

(52) U.S. Cl. .................. 359/291; 359/295; 359/226

(58) Field of Classification Search .................. 359/214, 359/224, 226, 263, 290, 291, 295, 298, 872, 359/871; 438/1, 479; 216/23, 24
See application file for complete search history.

(56) References Cited

U.S. PATENT DOCUMENTS

| | | | |
|---|---|---|---|
| 6,992,810 B2 | 1/2006 | Pan et al. | 359/290 |
| 2005/0128564 A1 | 6/2005 | Pan | 359/291 |
| 2007/0121191 A1 | 5/2007 | Pan | 359/291 |
| 2007/0121192 A1 | 5/2007 | Lee et al. | 359/291 |
| 2007/0127110 A1 | 6/2007 | Pan | 359/298 |
| 2007/0132681 A1 | 6/2007 | Chen | 345/85 |

*Primary Examiner*—Loha Ben
(74) *Attorney, Agent, or Firm*—Fish & Richardson P.C.

(57) ABSTRACT

A spatial light modulator includes a mirror plate comprising a reflective upper surface, a louver surface having a recess in the lower surface, a first cavity having an opening on the lower surface, and a cantilever situated under the recess and connected with the lower portion of the mirror plate. The mirror plate can tilt around a hinge component extending into the first cavity. The hinge component is supported by a stationary substrate. The tilt movement of the mirror plate can be stopped when the cantilever comes to contact with a stationary object.

38 Claims, 19 Drawing Sheets

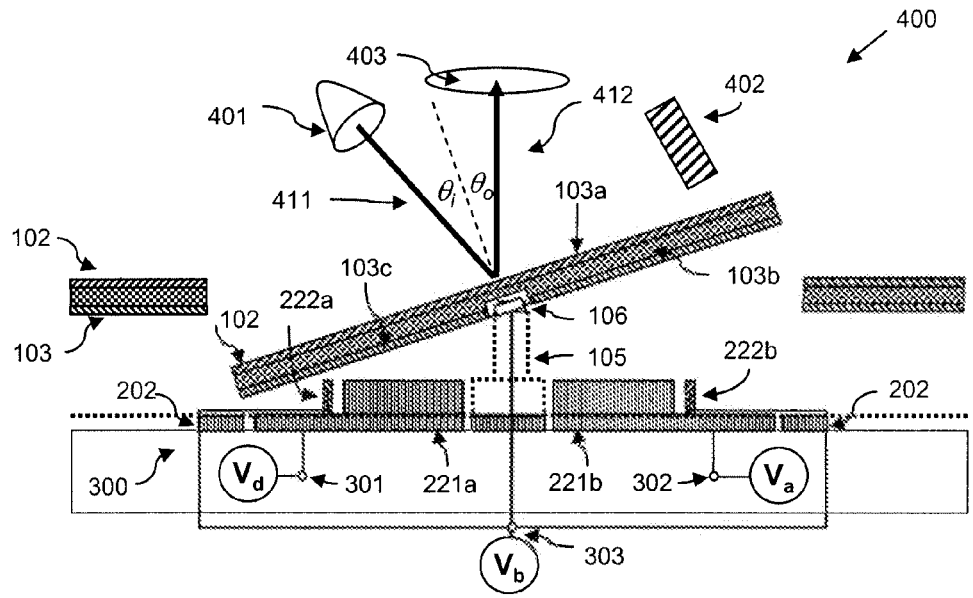
Fig. 1a: cross section view of a part of the spatial light modulator according to one embodiment of the present invention deflecting illumination to an "on" state.
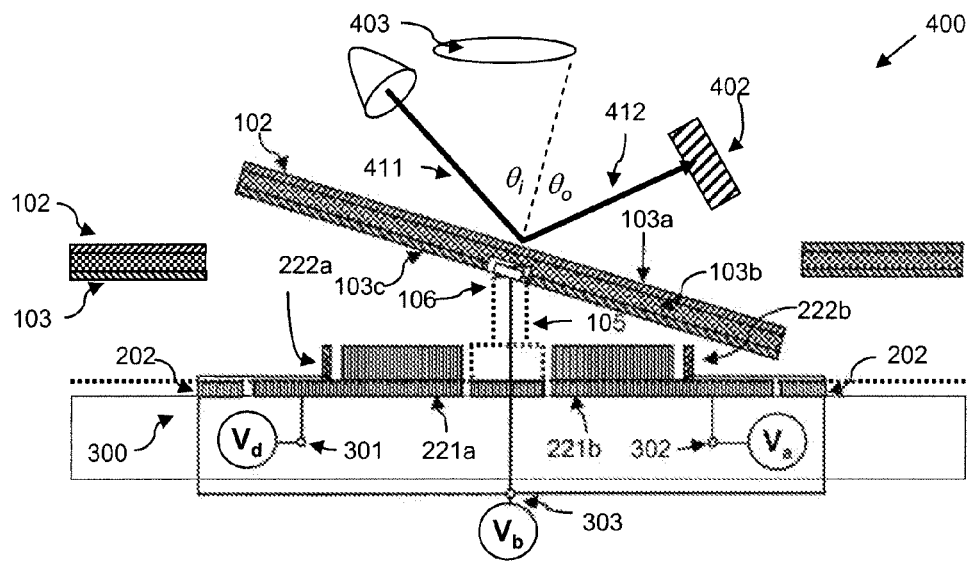
Fig. 1b: cross section view of a part of the spatial light modulator according to one embodiment of the present invention deflecting illumination to an "off" state.

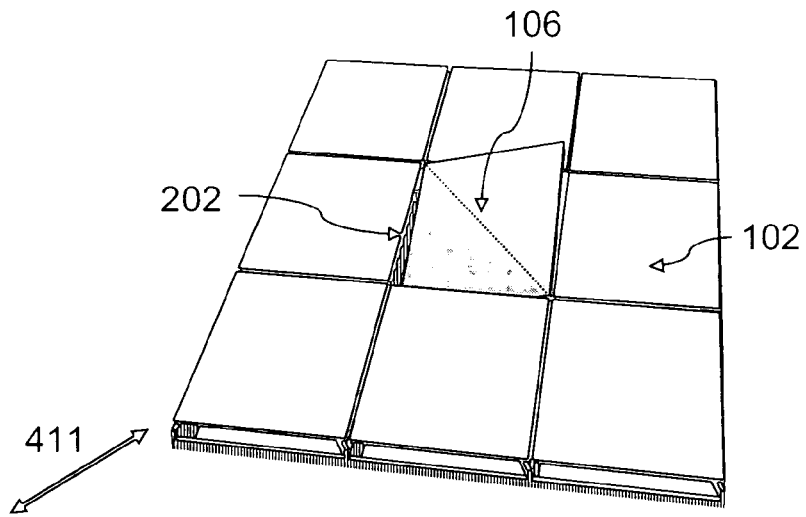
Fig. 2: A perspective view showing the top of a part of the arrays of rectangular shape mirrors for a projection system with diagonal illumination configuration.
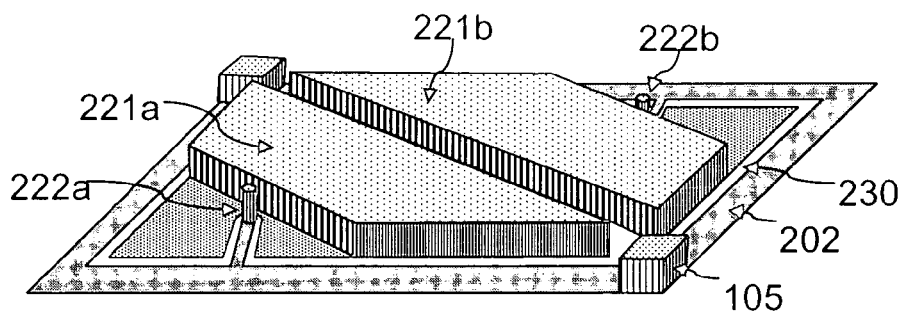
Fig. 3: A perspective view showing the top of a part of the control circuitry substrate for a projection system with diagonal illumination configuration.

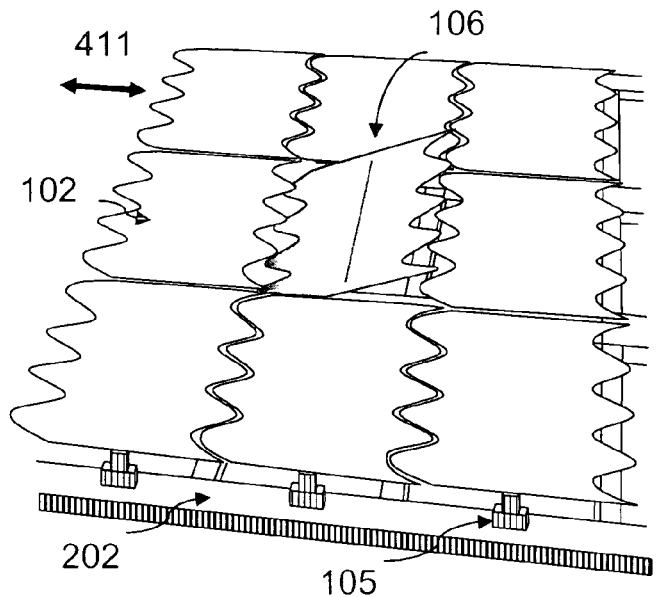

Fig. 4: A perspective view showing the top of a part of the mirror array with each mirror having a series of curvature shapes leading and trailing edges for a projection system with orthogonal illumination configuration.

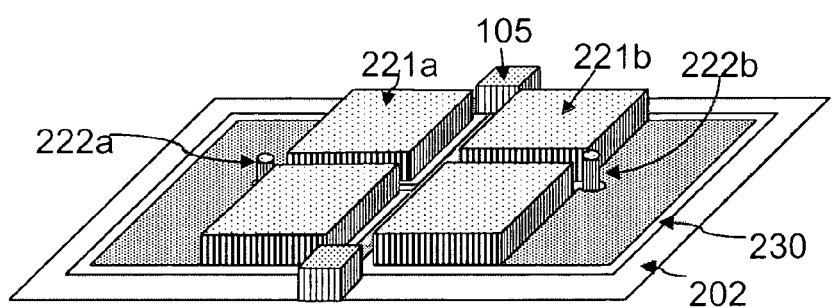

Fig. 5: A perspective view showing the top of a part of the control circuitry substrate for a projection system with orthogonal illumination configuration.

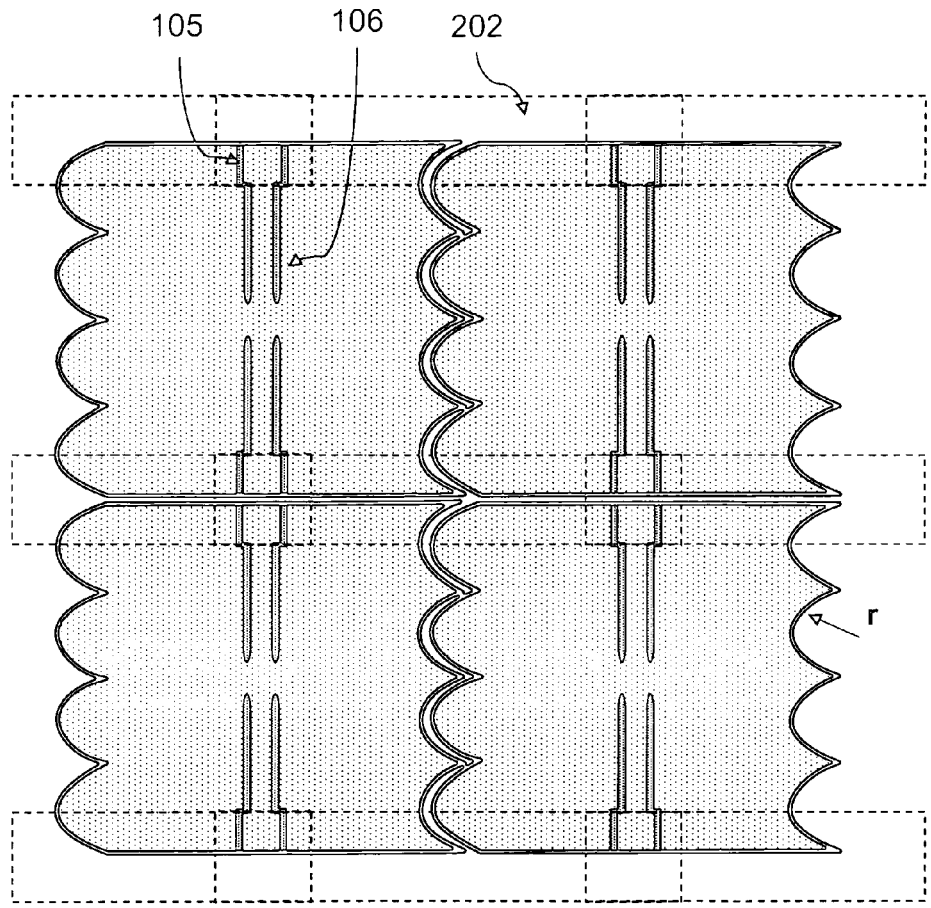
Fig. 6: An enlarged backside view of a part of the mirror array with each mirror having a series of curvature shapes leading and trailing edges for a projection system with orthogonal illumination configuration.

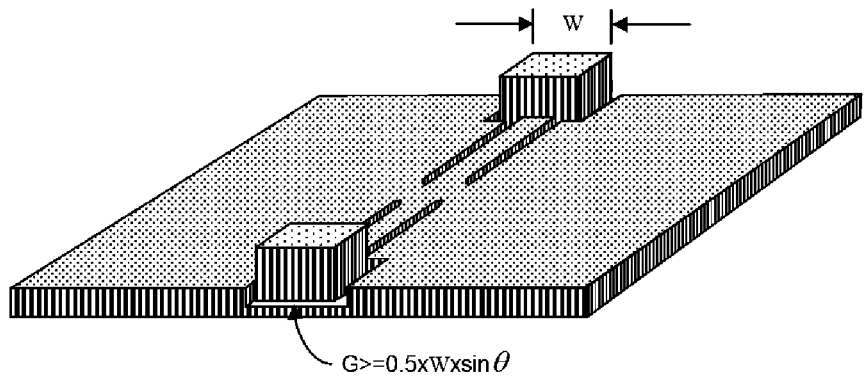
Fig. 7: A perspective view showing the embedded torsion hinges and their support posts under the cavities in the lower portion of a mirror plate.
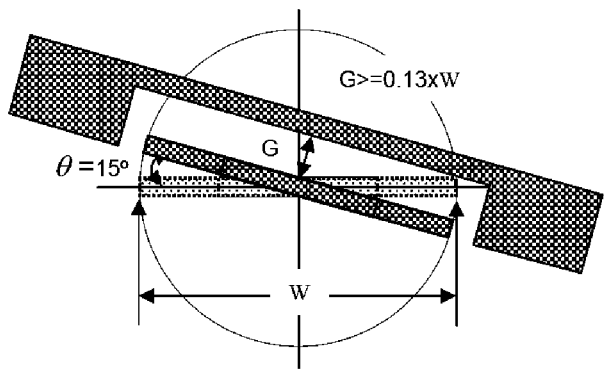
Fig. 8: A diagram illustrates a minimum air gap spacing around the embedded torsion hinge of a mirror plate when rotated 15° in one direction.

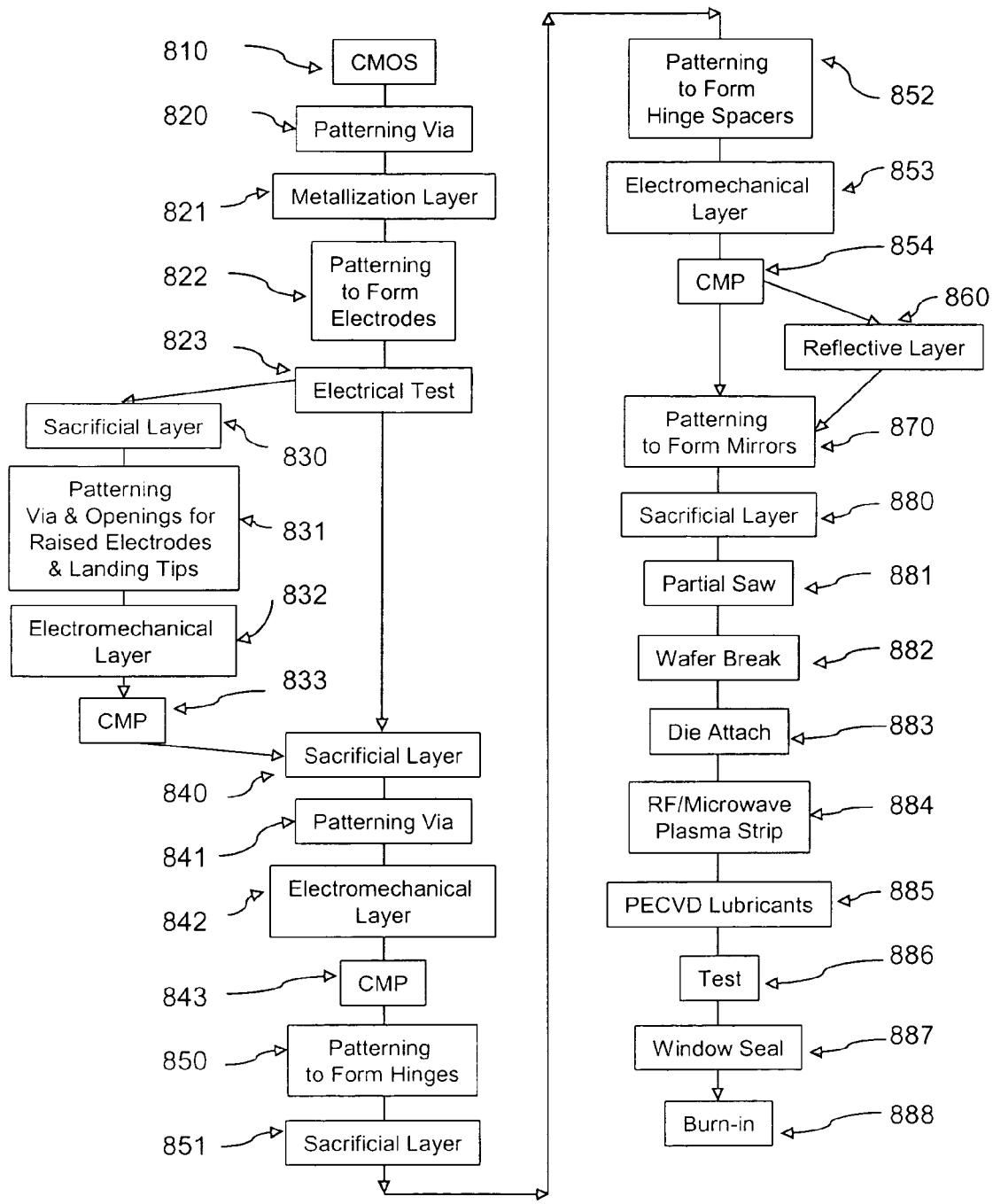
Fig. 9: A manufacturing process flow diagram for a high contrast SLM.

Figs. 10-13: Cross section side views of a part of a spatial light modulator illustrating one method for fabricating a plurality of support frames and the first level electrodes connected to the memory cells in the addressing circuitry.

Figs. 14-17: Cross section side views of a part of a spatial light modulator illustrating one method for fabricating a plurality of support posts, second level electrodes, and landing tips on the surface of control substrate.

Figs. 18-20: Cross section side views of a part of a spatial light modulator illustrating one method for fabricating a plurality of torsion hinges and its supports on the support frame.

Figs. 21-23: Cross section side views of a part of a spatial light modulator illustrating one method for fabricating a mirror plate with a plurality of embedded hidden hinges.

Figs. 24-26: Cross section side views of a part of a spatial light modulator illustrating one method for forming the reflective mirrors and releasing individual mirrors of a micro mirror array.

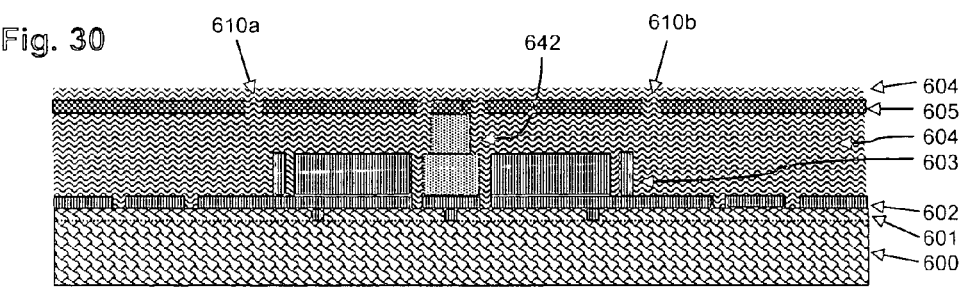
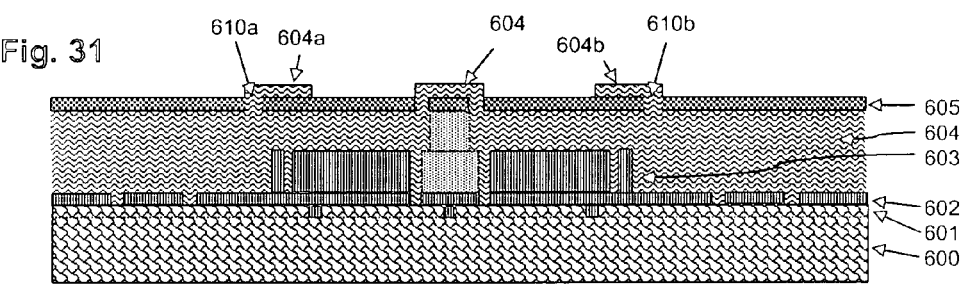
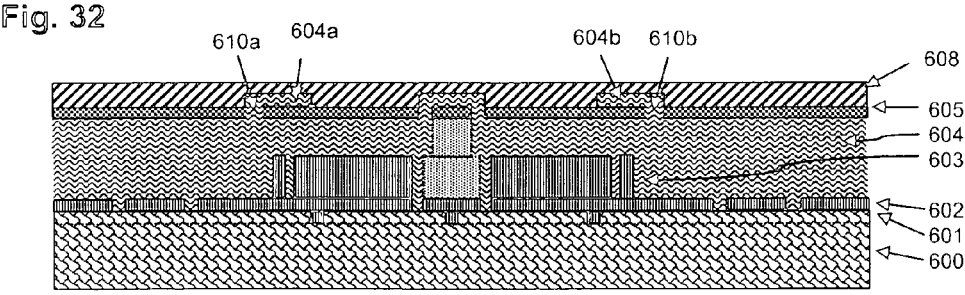

SPATIAL LIGHT MODULATOR HAVING A CANTILEVER ANTI-STICTION MECHANISM

BACKGROUND

The present disclosure relates spatial light modulators.

In general, a micro mirror array is a type of spatial light modulator (SLM) that includes an array of cells, each of which includes a micro mirror plate that can be tilted about an axis and, furthermore, circuitry for generating electrostatic forces that tilt the micro mirror plate. In one implementation, for example, a digital mode of operation, there are two positions at which the micro mirror plate can be tilted. In an "on" position or state, the micro mirror plate directs incident light to an assigned pixel of a display device. In an "off" position or state, the micro mirror plate directs incident light away from the display device.

A cell typically includes a first structure and a second structure configured to mechanically stop the cell's micro mirror plate at the "on" position and the "off" position, respectively. These structures are referred to in the present specification as mechanical stops. The SLM generally operates by tilting a selected combination of micro mirrors to project light to form appropriate image pixels in a display image. A display device based on SLM is usually required to refresh image frames at high frequencies typical of video applications. Each instance of image frame refreshing can involve the tilting of all or some of the micro mirrors to new respective orientations. Providing fast response tilt movement by the mirrors is therefore crucial to any functional SLM-based display device. One issue with the mirror response rate is related to the stiction, i.e., the contact-surface adhesion, between the lower surface of the mirror and the mechanical stops, which can cause a delay in the mirror tilt response or prevent a mirror from tilting to a new orientation.

SUMMARY

In one general aspect, the present invention relates to a spatial light modulator that includes a mirror plate comprising a reflective upper surface, a lower surface having a recess in the lower surface, a first cavity having an opening on the lower surface, and a cantilever situated under the recess and connected with the lower portion of the mirror plate, wherein the mirror plate is configured to tilt around a hinge component extending into the first cavity, the hinge component being supported by a stationary substrate, and wherein the tilt movement of the mirror plate can be stopped when the cantilever comes to contact with a stationary object.

In another general aspect, the present invention relates to a spatial light modulator that includes a mirror plate comprising a reflective upper surface, a lower surface having a recess in the lower surface, a first cavity having an opening on the lower surface, and a cantilever situated under the recess and connected with the lower portion of the mirror plate, wherein the mirror plate is configured to tilt around a hinge component extending into the first cavity; a substrate comprising an upper surface, a hinge support post in connection with the upper surface, and a hinge component in connection with the hinge support post and the mirror plate; and a landing tip in connection with the upper surface of the substrate, wherein the tilt movement of the mirror plate can be stopped when the cantilever comes to contact with a landing tip.

In another general aspect, the present invention relates to a method of fabricating a spatial light modulator that includes forming a substrate comprising an upper surface, a hinge support post in connection with the upper surface, a hinge component in connection with the hinge support post, and a landing tip in connection with the upper surface; and forming the mirror plate in connection with the hinge component, comprising a reflective upper surface, a lower surface having a recess in the lower surface, a first cavity having an opening in the lower surface, and a cantilever situated under the recess and connected with the lower portion of the mirror plate, wherein the hinge component extends into the first cavity to permit the mirror plate to tilt around the hinge component, and wherein the cantilever can stop the tilt movement of the mirror plate by coming to contact with the landing tip.

Implementations of the system may include one or more of the following. The recess can form a second cavity having an opening in the lower surface of the mirror plate. The recess can be located at the corner of the lower surface of the mirror plate. The mirror plate can include two or more cantilevers each configured to come to contact a stationary object to stop the tilt movement of the mirror plate at a predetermined orientation. The cantilever can be substantially parallel to the lower surface of the mirror plate. The cantilever can be oriented pointing to a corner or an edge of the mirror plate. The stationary substrate can include an upper surface, a hinge support post in connection with the upper surface, and the hinge component in connection with the hinge support post and the mirror plate. A gap can be formed between the surfaces in the first cavity and the hinge component to permit the tilt movement of the mirror plate. The spatial light modulator can further include an electrode over the upper surface of the stationary substrate and a conductive surface portion in the lower surface of the mirror plate. The mirror plate can be configured to tilt when an electric voltage is applied between the electrode over the stationary substrate and the conductive surface portion of the lower surface of the mirror plate. The cantilever can be deformed by the stationary object when the rotation of the mirror plate is stopped by the contact between the cantilever and the stationary object. The deformed cantilever can be configured to produce an elastic force pushing against the stationary object. The stationary object can be connected with the stationary substrate. The cantilever can be the only portion on the mirror plate that can come to contact with the stationary object. The cantilever can include a material selected from the group of titanium, tantalum, tungsten, molybdenum, an alloy, silicon, amorphous silicon, polysilicon, and a silicide. The cantilever and the hinge component can include substantially the same material composition. The cantilever and hinge component can include a different material composition from the material composition in the main body of the mirror plate. The cantilever can include substantially the same material as the main body of the mirror plate.

Implementations may include one or more of the following advantages. The disclosed system and methods provide ways to reduce or prevent mirror-substrate adhesion and increase the response time of the micro-mirrors. A pair of landing tips are fabricated on the surface of control substrate. These landing tips are specialized mechanical stops, each of which provides a reduced contact area between itself and a micro mirror. The reduced contact area can reduce or eliminate stiction between the micro mirror and the landing tips and, thus, improve the reliability of mechanical landing operation. Furthermore, these landing tips can facilitate a mirror-landing separation by applying a sharp bipolar pulsing voltage on a common bias of the mirror array. The kinetic energy of the electromechanical shock generated by bipolar pulsing is converted into the elastic strain energy stored in the deformed mirror hinges and deformed landing tips. The stored energy is then released when the deformed hinge and landing tip regain their respective shapes, which can spring and bounce the mirror, separating it from the landing tip.

The separation between the landing tips and the mirror plate can be further assisted by one or more cantilever members of the micro mirror plate. Each cantilever member is situated at a bottom surface of the micro mirror plate and, furthermore, is configured so that it is the part of the micro mirror plate that comes into contact with the respective landing tip when the mirror is tilted toward the landing tip. For each cantilever member, there is a cavity in the bottom surface of the micro mirror plate. The cavity is situated above and accommodates the cantilever member when the cantilever member flexes as a result of coming into contact with the landing tip. A landing tip comes to contact with the cantilever to stop the mirror plate at a predetermined orientation when the mirror plate is driven by an electric force under voltage applied between the lower conductive surface of the mirror plate and one or more electrode over the substrate. The electric force exerted on the mirror plate produces a distortion in the cantilever, which stores a mechanical potential energy in the cantilever. The mechanical potential energy is released to produce a repelling force when the electric voltage is removed or reversed.

Furthermore, the surface contact adhesion between the cantilever and landing tips can be reduced by coating an anti-stiction layer inside the device structures. The mirror plates can therefore quickly tilt from one orientation to another orientation. The system response time can thus be improved.

The disclosed system and methods are compatible with a wide range of applications, such as video displays and printings, display, printing, photo patterning in maskless photolithography, and photonic switches for directing optical signals among different optical fiber channels.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

FIG. 1a illustrates a cross section view of a part of the spatial light modulator according to one embodiment of the present invention deflecting illumination to an "on" state.

FIG. 1b illustrates a cross section view of a part of the spatial light modulator according to one embodiment of the present invention deflecting illumination to an "off" state.

FIG. 2 is a perspective view showing the top of a part of the arrays of rectangular shape mirrors for a projection system with diagonal illumination configuration.

FIG. 3 is a perspective view showing the top of a part of the control circuitry substrate for a projection system with diagonal illumination configuration.

FIG. 4 is a perspective view showing the top of a part of the mirror array with each mirror having a series of curvature shapes leading and trailing edges for a projection system with orthogonal illumination configuration.

FIG. 5 is a perspective view showing the top of a part of the control circuitry substrate for a projection system with orthogonal illumination configuration.

FIG. 6 is an enlarged backside view of a part of the mirror array with each mirror having a series of curvature shapes leading and trailing edges for a projection system with orthogonal illumination configuration.

FIG. 7 is a perspective view showing the torsion hinges and their support posts under the cavities in the lower portion of a mirror plate.

FIG. 8 is a diagram illustrating a minimum air gap spacing around the torsion hinge of a mirror plate when rotated 15° in one direction.

FIG. 9 is a manufacturing process flow diagram for a high contrast spatial light modulator.

FIGS. 30-32 illustrate the process for fabricating the mirror plate of FIG. 27.

DETAILED DESCRIPTION

Figure 10:
FIGS. 10-13 are cross section side views of a part of a spatial light modulator illustrating one method for fabricating a plurality of support frames and the first level electrodes connected to the memory cells in the addressing circuitry.

FIG. 1a shows a cross section view of a portion of a spatial light modulator 400 wherein a micro mirror is in an "on" position. Incident light 411 from a source of illumination 401 is directed at an angle of incidence θi and is reflected at an angle of θo as reflected light 412 toward a display surface through a projection pupil 403. FIG. 1b shows a cross section view of the same part of the spatial light modulator while the mirror plate is rotated toward another electrode under the other side of the hinge 106. The same directional light 411 is deflected to 412 a much larger angles θi and θo, predetermined by the dimensions of mirror 102 and the air gap spacing between its lower surfaces of mirror plate 103 to the springy landing tips 222a and 222b, and exits toward a light absorber 402.

With the embodiment depicted in FIGS. 1a and 1b, the high contrast SLM 400 includes three major portions: the bottom portion of control circuitry, the middle portion of a plurality of step electrodes, landing tips, hinge support posts, and the upper portion covered with a plurality of mirrors with hidden torsion hinges and cavities.

The bottom portion includes a wafer substrate 300 with addressing circuitries to selectively control the operation of each mirror in the micro mirror array of SLM. The addressing circuitries include an array of memory cells and word-line/bit-line interconnect for communication signals. The electrical addressing circuitry on a silicon wafer substrate can be fabricated using standard CMOS technology, and resembles a low-density memory array.

The middle portion of the high contrast SLM 400 includes step electrodes 221, landing tips 222, hinge support posts 105, and a support frame 202. The multi-level step electrodes 221 are designed to improve the capacitive coupling efficiency of electrostatic torques during the angular cross over transition. By raising the electrode 221 surfaces near the hinge 106 area, the air gap spacing between the mirror plate 103 and the electrodes 221 is effectively narrowed. Since the electrostatic attractive force is inversely proportional to the square of the distance between the mirrors and electrodes, this effect becomes apparent when mirror is tilted at its landing positions. When operating in analog mode, high efficient electrostatic coupling allows a more precise and stable control of the tilting angles of the individual micro mirror in the spatial light modulator. In a digital mode, it requires much lower driving voltage potential in addressing circuitry to operate. The height differences between the first level electrodes 221 to the second may vary from 0.2 micron to 3 microns depends on the relative height of air gap between the first level electrodes to the mirror plate.

On the top surface of control substrate, a pair of stationary landing tips 222a and 222b is designed to have a same height as that of second level electrodes 221 for manufacturing simplicity. The landing tips 222a and 222b can provide a gentle mechanical touch-down for the mirror to land on each angular cross over transition at a pre-determined angle precisely. Adding a stationary landing tip 222 on the surface of control substrate enhances the robotics of operation and prolongs the reliability of the devices. Furthermore, the landing tips 222a and 222b allow an ease of separation between the mirror plate 103 and its contact stop 222, which effectively eliminates the contact surface adhesion during a digital operation of SLM. For example, to initiate an angular cross over transition, a sharp bipolar pulse voltage Vb is applied to the bias electrode 303, typically connected to each mirror plate 103 through its torsion hinges 106 and support posts 105. The voltage potential established by the bipolar bias vb enhances the electrostatic forces on both side of the hinge 106. This strengthening is unequal on two sides at the landing position, due to the large difference in air gap spacing. Though the increases of bias voltages Vb on the lower surface of mirror plate 103 (at layers 103b and 103c have less impact on which direction the mirror 103 will rotate toward, a sharp increase of electrostatic forces F on the whole mirror plate 102 provides a dynamic excitation by converting the electromechanical kinetic energy into an elastic strain energy stored in the deformed mirror hinges 106 and deformed landing tips 222a or 222b. After a bipolar pulse is released on the common bias vb, the elastic strain energy of deformed landing tip 222a or 222b and deformed mirror hinges 106 is converted back to the kinetic energy of mirror plate as it springs and bounces away from the landing tip 222a or 222b. This perturbation of mirror plate toward the quiescent state enables a much smaller address voltage potential Va for angular cross over transition of mirror plate 103 from one state to the other.

Hinge support frame 202 on the surface of control substrate 300 is designed to strengthen the mechanical stability of the pairs of mirror support posts 105, and retained the electrostatic potentials locally. For the simplicity, the height of support frames 202 is designed to be the same as the first level electrodes 221. With a fixed size of mirror plate 103, the height of a pair of hinge support posts 105 will determine the maximum deflection angles $\theta$ of a micro mirror array.

The upper portion of the high contrast SLM includes an array of micro mirrors with a flat optically reflective layer 102 on the upper surfaces and a pair of torsion hinges 106 under the cavities in the lower portion of mirror plate 103. Pair of torsion hinges 106 in the mirror plate 103 is fabricated to be part of the mirror plate 103 and are kept in a minimum distance under the reflective surface to allow only a gap for a pre-determined angular rotation. By minimizing the distances between a hinge rotating axes 106 to the upper reflective surfaces 102, the spatial light modulator effectively eliminates the horizontal displacement of each mirror during an angular transition. According to the present invention, the gaps between adjacent mirrors in the array of SLM can be reduced to less than 0.2 micron to achieve the highest active reflection area fill-ratio of a micro mirror array at the present time. plate 103 is fabricated to be part of the mirror plate 103 and are kept in a minimum distance under the reflective surface to allow only a gap for a predetermined angular rotation. By minimizing the distances between a hinge rotating axes 106 to the upper reflective surfaces 102, the spatial light modulator effectively eliminates the horizontal displacement of each mirror during an angular transition. According to the present invention, the gaps between adjacent mirrors in the array of SLM can be reduced to less than 0.2 microns to achieve the highest active reflection area fill-ratio of a micro mirror array at the present time.

The materials used for micro deflection devices are preferably conductive, stable, with suitable hardness, elasticity, and stress. Ideally a single material, such as the electromechanical materials, will cover both the stiffness of mirror plate 103 and plasticity of torsion hinges 106 having sufficient strength to deflect without fracturing. Furthermore, all the materials used in constructing the micro mirror array have to be processed under 400° C., a typical manufacturing process temperature without damaging the pre-fabricated circuitries in the control substrate.

In the implementation shown in FIGS. 1a and 1b, the mirror plate 103 includes three layers. A reflective top layer 103a is made of aluminum and is typically 600 angstrom thick. A middle layer 103b can be made of a silicon based material, for example, amorphous silicon, typically 2000 to 5000 angstroms in thickness. A bottom layer 103c is made of titanium and is typically 600 angstroms thick. As can be seen from FIGS. 1a and 1b, the hinge 106 can be implemented as part of the bottom layer 103c. The mirror plate 103 can be fabricated as described below.

According, to an alternative embodiment, the materials of mirror plates 103, torsion hinges 106, and support posts 105 are made of aluminum-silicon based electromechanical materials, such as aluminum, silicon, polysilicon, amorphous silicon, and aluminum-silicon alloys, and their alloys. The deposition is accomplished by PVD magnetron sputtering a single target containing either or both aluminum and silicon in a controlled chamber with temperature bellow 500° C. Same structure layers may also be formed by PECVD.

According to another alternative embodiment, the materials of mirror plates 103, torsion hinges 106, and support posts 105 can be made of refractory-metals based electromechanical materials such as silicon, polysilicon, amorphous silicon, aluminum, titanium, tantalum, tungsten, molybdenum, and silicides or alloys of aluminum, titanium, tantalum, tungsten, molybdenum. Refractory metal and their silicides are compatible with CMOS semiconductor processing and have relatively good mechanical properties. These materials can be deposited by PVD, by CVD, and by PECVD. The optical reflectivity may be enhanced by further PVD depositing a layer of metallic thin-films 102, such as aluminum, gold, or their alloys depending on the applications on the surfaces of mirror plate 103.

To achieve high contrast ratio of the deflected video images, any scattered light from a micro mirror array should be reduced or eliminated. Most common interferences come from the diffraction patterns generated by the scattering of illumination from the leading and trailing edges of individual mirrors. The solution to the diffraction problem is to weaken the intensity of diffraction pattern and to direct the scattered light from the inactive area of each pixel to different directions away from the projection pupil. One method is directing the incident light 411 45° to the edges of the square shape mirror 102 pixels, which sometimes called diagonal hinge or diagonal illumination configuration. FIG. 2 shows a perspective view showing the top of a part of the mirror array with each mirror 102 having a square shape using a diagonal illumination system. The hinges 106 of mirror in the array are fabricated in diagonal direction along two opposite corners of the mirror and in perpendicular to the light of illumination 411. The advantage of a square shape mirror with a diagonal hinge axis is its ability to deflect the scattered light from the leading and trailing edges 45° away from the projection pupil 403. The disadvantage is that it requires the projection prism assembly system to be tilted to the edge of the SLM. The diagonal illumination has a low optical coupling efficiency when a conventional rectangular TIR prism system is used to separate the light beams that are reflected by the mirror 102 that is respectively at the "on" state and the "off" state. The twisted focusing spot requires an illumination larger than the size of rectangular micro mirror array surfaces in order to cover all active pixel arrays. A larger rectangular TIR prism increases the cost, size, and the weight of the projection display.

FIG. 3 shows perspective view of the top of a part of the control circuitry substrate for the projection system with diagonal illumination configuration. The pair of step electrodes 221 is arranged diagonal accordingly to improve the electrostatic efficiently of the capacitive coupling to the mirror plate 103. The two micro tips 211a and 211b act as the landing stops for a mechanical landing of mirrors 103 to ensure the precision of tilted angle θ and to overcome the contact stiction. Made of high spring constant materials, these micro tips 222a and 222b act as landing springs to reduce the contact area when mirrors are snap down. Second function of these micro tips 222 at the edge of two-level step electrodes 221 is their spring effect to separate itself from the mirror plates 103. When a sharp bipolar pulse voltage potential Vb is applied on the mirror 103 through a common bias 303 of mirror array, a sharp increase of electrostatic forces F on the whole mirror plate 103 provides a dynamic excitation by converting the electromechanical kinetic energy into an elastic strain energy stored in the deformed mirror hinges 106. The elastic strain energy is converted back to the kinetic energy of mirror plate 103 as it springs and bounces away from the landing tip 222.

The periodic array of the straight or corner shape edges of mirror in a SLM creates a diffraction patterns tended to reduce the contrast of projected images by scattering the illumination 411 at a fixed angle. A curvature shape leading and trailing edges of mirror in the array generates much weaker diffraction patterns due to the variation of scattering angles of the illumination 411 on the edges of mirror. According to another embodiment, the reduction of the diffraction intensity into the projection pupil 403 while still maintaining an orthogonal illumination optics system is achieved by replacing the straight or fixed angular corner shape edges of a rectangular shape mirror with at least one or a series curvature shape leading and trailing edges with opposite recesses and extensions. Forming a curvature in the leading and trailing edges that is in perpendicular to the incident illumination 411 weakens the diffraction intensity and reduces a large portion of scattering light diffracted directly into the projection system.

Orthogonal illumination has a higher optical system coupling efficiency, and requires a less expensive, smaller size, and lighter TIR prism. However, since the scattered light from both leading and trailing edges of mirror is scattered straightly into the projection pupil 403, it creates a diffraction patterns reducing the contrast ratio of a SLM. FIG. 4 shows a perspective view of the top of a part of mirror array with rectangular shape mirrors for the projection system with orthogonal illumination configuration. The torsion hinges 106 are in parallel to the leading and trailing edges of mirror and in perpendicular to the light of illumination 411. So the mirror pixels in the SLM are illuminated orthogonally. In FIG. 4, each mirror in the array has a series of curvatures in the leading edge extension and trailing edge recession. The principle is that a curvature edge weakens the diffraction intensity of scattered light and it further diffracts a large portion of scattered light at a variation of angles away from the optical projection pupil 403. The radius curvature of leading and trailing edges of each mirror r may vary depending on the numbers of curvatures selected. As the radius of curvature r becomes smaller, the diffraction reduction effect becomes more prominent. To maximize the diffraction reduction effects, according to another embodiment, a series of small radius curvatures r are designed to form the leading and trailing edges of each mirror in the array. The number of curvatures may vary depending on the size of mirror pixels, with a 10 microns size square mirror pixel, two to four curvatures on each leading and trailing edges provides an optimum results an low diffraction and within current manufacturing capability.

FIG. 5 is a perspective view showing the top of a part of the control circuitry substrate 300 for a projection system with orthogonal illumination 411 configurations. Unlike conventional flat electrodes, the two-level step electrodes 221 raised above the surface of control substrate 300 near the hinge axis narrows the effective air gap spacing between the flat mirror plate 103 and the bottom electrodes 221, which significantly enhancing the electrostatic efficiency of capacitive coupling of mirror plate 103. The number of levels for the step electrodes 221 can vary from one to ten. However, the larger the number of levels for step electrodes 221 the more complicated and costly it takes to manufacture the devices. A more practical number would be from two to three. FIG. 5 also shows the mechanical landing stops made of micro tips 222 oriented in perpendicular to the surface of control substrate 300. These tips 222 provide a mechanical stop during the landing operation of angular cross over transitions. The micro tips 222 at the edge of step electrodes 221 act as landing tips to further overcome the contact surface adhesion. This low voltage driven and high efficiency micro mirror array design allows an operation of a larger total deflection angle ($|\theta|>15°$) of micro mirrors to enhance the brightness and contrast ratio of the SLM.

Another advantage of this reflective spatial light modulator is that it produces the highest possible active reflection area fill-ratio by positioning the torsion hinge 106 under the cavities in the lower portion of mirror plate 103, which almost completely eliminates the horizontal displacement of mirror plate 103 during an angular cross over transition. FIG. 6 shows an enlarged backside view of a part of the mirror array designed to reduce diffraction intensity using four-curvature leading and trailing edges for a projection system with orthogonal illumination 411 configuration. Again, pairs of torsion hinges 106 are positioned under two cavities as part of the mirror lower portion 103 and supported by a pair of support posts 105 on top of support frames 202. A pair of hinge support post 105 has a width W in the cross section much larger than the width of torsion hinge bar 106. Since the distance between the axis of hinge 106 and the reflective surfaces of mirror is kept minimum, a high active reflection area fill-ratio is achieved by closely packed individual mirror pixels without worrying the horizontal displacement. In one of the present invention, mirror pixel size (a×b) is about 10 microns×10 microns, while the radius of curvature r is about 2.5 microns.

FIG. 7 shows an enlarged backside view of a part of the mirror plate showing the torsion hinges 106 and their support posts 105 under the cavities in the lower portion of a mirror plate 103. To achieve optimum performance, it is important to maintain a minimum air gap G in the cavity where the torsion hinges 106 are created. The dimension of hinges 106 varies depending on the size of the mirrors 102. In one implementation, the dimension of each torsion hinge 106 is about 0.1×0.2×3.5 microns, while the support post 105 has a square shape cross section with each side W about 1.0 micron width. Since the top surfaces of support posts 105 are also under the cavities as lower part of the mirror plate 103, the air gap G in the cavity needs to be high enough to accommodate the angular rotation of mirror plate 103 without touching the larger hinge support posts 105 at a predetermined angle $\theta$. In order for the mirror to rotate a pre-determined angle $\theta$ without touching the hinge support post 105, the air gap of the cavities where torsion hinges 106 are positioned must be larger than $G=0.5\times W\times SIN(\theta)$, where W is the cross section width of hinge support posts 105.

FIG. 8 illustrates a minimum air gap spacing G around the torsion hinge 106 of a mirror plate 103 when rotated 15° in one direction. The calculation indicates the air gap spacing G of torsion hinge 106 in the cavity must be larger than $G=0.13$ W. If width of each side W of a square shape hinge support post 105 is 1.0 micron, the air gap spacing G in the cavity should be larger than 0.13 micron. Without horizontal displacement during the angular transition operation, the horizontal gap between the individual mirrors in the micro mirror array may be reduced to less than 0.2 micron, which led to a 96% active reflection area fill-ratio of the SLM according to the present invention.

Fabrication of a high contrast spatial light modulator can be implemented as four sequential processes using standard CMOS technology. A first process forms a control silicon wafer substrate with support frames and arrays of first level electrodes on the substrate surface. The first level electrodes are connected to memory cells in addressing circuitry in the wafer. A second process forms a plurality of second level electrodes, landing tips, and hinge support posts on the surfaces of control substrate. A third process forms a plurality of mirrors with hidden hinges on each pairs of support posts. Lastly in a fourth process, the fabricated wafer is separated into individual spatial light modulation device dies before finally removing remaining sacrificial materials.

FIG. 9 is a flow diagram illustrating a process for making a high contrast spatial light modulator. The manufacturing processes starts by fabricating a CMOS circuitry wafer having a plurality of memory cells and word-line/bit-line interconnection structures for communicating signals as the control substrate using common semiconductor technology (step 810).

Figure 11:
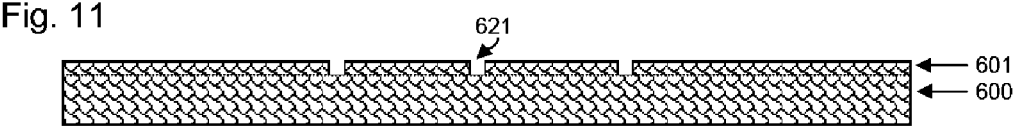

A plurality of first level electrodes and support frames are formed by patterning a plurality of via through the passivation layer of circuitry opening up the addressing nodes in the control substrate (step 820). To enhance the adhesion for subsequent electromechanical layer, the via and contact openings are exposed to a 2000 watts of RF or microwave plasma with 2 torr total pressures of a mixture of $O_2$, $CF_4$, and $H_2O$ gases at a ratio of 40:1:5 at about 250° C. temperatures for less than five minutes. An electromechanical layer is deposited by physical vapor deposition (PVD) or plasma-enhanced chemical vapor deposition (PECVD) depending on the materials selected filling via and forming an electrode layer on the surface of control substrate (step 821). The deposition of the electromechanical layer and the subsequent formation of the vias are illustrated in FIGS. 10 and 11, and discussed below in relation to FIGS. 10 and 11.

Figure 12:
Figure 13:
Figure 14:
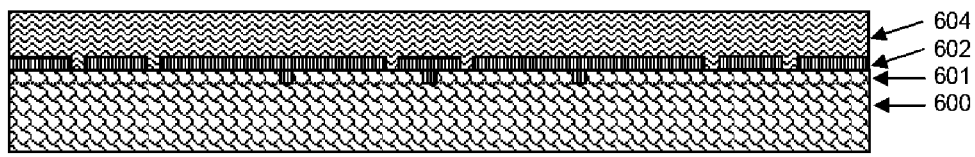
FIGS. 14-17 are cross section side views of a part of a spatial light modulator illustrating one method for fabricating a plurality of support posts, second level electrodes, and landing tips on the surface of control substrate.

Then the electromechanical layer is patterned and etched anisotropically through to form a plurality of electrodes and support frames (step 822). The partially fabricated wafer is tested to ensure the electrical functionality before proceeding to further processes (step 823). The formation of electrodes and support frames are illustrated in FIGS. 12 and 13 and described in detail below in the related discussions.

In according to one embodiment, the electromechanical layer deposited and patterned in the steps 821 and 822 can include a metal including, for example, a pure Al, titanium, tantalum, tungsten, molybdenum film, an Al/poly-Si composite, an Al—Cu alloy, or an Al—Si alloy. While each of these metallization has slightly different etching characteristics, they all can be etched in similar chemistry in plasma etching of Al. In present invention, a two step processes is carried out to etch aluminum metallization layers anisotropically. First, the wafer is etched in inductive coupled plasma while flowing with $BCl_3$, $Cl_2$, and Ar mixtures at flow rates of 100 sccm, 20 sccm, and 20 sccm respectively. The operating pressure is in the range of 10 to 50 mTorr, the inductive coupled plasma bias power is 300 watts, and the source power is 1000 watts. During the etching process, wafer is cooled with a backside helium gas flow of 20 sccm at a pressure of 1 Torr. Since the Al pattern can not simply be removed from the etching chamber into ambient atmosphere, a second oxygen plasma treatment step must be performed to clean and passivate Al surfaces. In a passivation process, the surfaces of partially fabricated wafer is exposed to a 2000 watts of RF or microwave plasma with 2 torr pressures of a 3000 sccm of H2O vapor at about 250° C. temperatures for less than three minutes.

According to another embodiment, the electromechanical layer is silicon metallization, which can take the form of a polysilicon, a polycides, or a silicide. While each of these electromechanical layers has slightly different etching characteristics, they all can be etched in similar chemistry in plasma etching of polysilicon. Anisotropic etching of polysilicon can be accomplished with most Cl and F based feedstock, such as $Cl_2$, $BCl_3$, $CF_4$, $NF_3$, $SF_6$, HBr, and their mixtures with Ar, $N_2$, $O_2$, and $H_2$. In present invention, the poly silicon or silicide layer (WSix, or TiSix, or TaSi) is etched anisotropically in inductive decoupled plasma while flowing with $Cl_2$, $BCl_3$, HBr, and $HeO_2$ gases at flow rates of 100 sccm, 50 sccm, 20 sccm, and 10 sccm respectively. In another embodiment, the polycide layer is etched anisotropically in a reactive ion etch chamber flowing with $Cl_2$, $SF_6$, HBr, and $HeO_2$ gases at a flow rate of 50 sccm, 40 sccm, 40 sccm, and 10 sccm respectively. In both cases, the operating pressure is in the range of 10 to 30 mTorr, the inductive coupled plasma bias power is 100 watts, and the source power is 1200 watts. During the etching process, wafer is cooled with a backside helium gas flow of 20 sccm at a pressure of 1 Torr. A typical etch rate can reach 9000 angstroms per minute.

A plurality of second level electrodes can be fabricated on the surfaces of the control substrate to reduce the distance between the mirror plate and the electrode on the substrate, which improves the electrostatic efficiency. Landing tips can also be fabricated on the substrate to reduce stiction between the mirror plate and the substrate. First, a layer of sacrificial materials is deposited with a predetermined thickness on the surface of partially fabricated wafer (step 830). If the sacrificial material is photoresist, the layer is spin coated on the surface. If it is organic polymer, the layer is deposited by PECVD. To prepare for the subsequent build up, the sacrificial layer has to be hardened by exposing the layer to ultraviolet light, then exposing to a $CF_4$ plasma for about three minutes, then baking the layer at about 150° C. for about two hours, finally exposing the layer to oxygen plasma for about one minute. Second, the sacrificial layer is patterned forming via and contact openings for a plurality of second level electrodes, landing tips, and support posts (step 831). Third, a second electromechanical layer is deposited by PVD or PECVD depending on the materials selected forming a plurality of second level electrodes, landing tips, and support posts (step 832). Finally, the second electromechanical layer is planarized to a predetermined thickness by chemical mechanical polishing (CMP) (step 833). The height of second level electrodes and landing tips can be less than one micron. Step 830 through step 833 can be repeated to build a number of steps in the step electrodes 221*a* and 221*b*. The number of repeated steps 830-833 is determined by the number of steps in the step electrodes 221*a* and 221*b*. The steps 830-833 can be bypassed (i.e. from step 823 directly to step 840) when a flat electrode is fabricated on the control substrate.

Once the raised multi-level step electrodes and landing tips are formed on the CMOS control circuitry substrate, a plurality of mirrors with hidden hinges on each pairs of support posts are fabricated. The processes started with depositing sacrificial materials with a predetermined thickness on the surface of partially fabricated wafer (step 840). Then sacrificial layer is patterned to form via for a plurality of hinge support posts (step 841). The sacrificial layer is further hardened before a deposition of electromechanical materials by PVD or PECVD depending on materials selected to fill via and form a thin layer for torsion hinges and part of mirrors (step 842). The electromechanical layer planarized to a predetermined thickness by CMP (step 843). The electromechanical layer is patterned a plurality of openings to form a plurality of torsion hinges (step 850). To form a plurality of cavities in the lower portion of mirror plate and torsion hinges positioned under the cavity, sacrificial materials is again deposited to fill the opening gaps around the torsion hinges and to form a thin layer with a predetermined thickness on top of hinges (step 851). The thickness can be slightly larger than $G=0.5 \times W \times SIN(\theta)$, where W is the cross section width of hinge support posts 105. The sacrificial layer patterned to form a plurality of spacers on top of each torsion hinge (step 852). More electromechanical materials are deposited to cover the surface of partially fabricated wafer (step 853). The electromechanical layer is planarized to a predetermined thickness by CMP (step 854) before patterned a plurality of openings to form a plurality of air gaps between individual mirror plates (step 870). The reflectivity of mirror surface may be enhanced by a PVD deposition of 400 angstroms or less thickness reflective layer selected from the group consisting of aluminum, gold, and combinations thereof (step 860).

To separate the fabricated wafer into individual spatial light modulation device dies, a thick layer of sacrificial materials is deposited to cover the fabricated wafer surfaces for protection (step 880). Then the fabricated wafer is partially sawed (step 881) before separating into individual dies by scribing and breaking (step 882). The spatial light modulator device die is attached to the chip base with wire bonds and interconnects (step 883) before a RF or microwave plasma striping of the remaining sacrificial materials (step 884). The SLM device die is further lubricated by exposing to a PECVD coating of lubricants in the interfaces between the mirror plate and the surface of electrodes and landing tips (step 885) before electro-optical functional test (step 886). Finally, the SLM device is hermetically sealed with a glass window lip (step 887) and sent to burn-in process for reliability and robust quality control (step 888).

One of the major problems in the digital operation of micro mirror array is the high stiction of micro mirror at a mechanical landing position. The surface contact adhesion could increases beyond the electrostatic force of control circuitry causing the device from stiction failure in a moisture environment. To reduce the contact adhesion between the mirror plate 103 and landing tips 222, and protect the mechanical wear degradation of interfaces during the touch and impact of angular cross over transition, a thin lubricated coating is deposited on the lower portion of mirror plate 103 and on the surface of electrodes 221 and landing tips 222. The lubricants chosen should be thermally stable, low vapor pressure, and non-reactive with metallization and electromechanical materials that formed the micro mirror array devices.

A think layer of fluorocarbon material can be coated to the surfaces of the lower portion of mirror plate and on the surface of electrodes and landing tips. The SLM device die is exposed to plasma of fluorocarbons, such as CF4, at a substrate temperature of about 200° C. temperatures for less than five minutes. The fluorine on the surfaces 103 serves to prevent adherence or attachment of water to the interfaces of mirror plate and the underneath electrodes and landing tips, which eliminates the impact of humidity in the stiction of mirror during landing operation. Coating fluorocarbon film in the interfaces between the mirror plate 103 and underneath electrodes 221 and landing tips 222 provides a sufficient repellent performance to water due to the fluorine atoms existing near the exposed surfaces.

In another embodiment, a perfluoropolyether (PFPE) or a mixture of PFPE or a phosphazine derivative is deposited by PECVD in the interfaces between the mirror plate 103 and underneath electrodes 221 and landing tips 222 at a substrate temperature of about 200° C. temperatures for less than five minutes. PFPE molecules have an aggregate vapor pressure in the range of $1 \times 10^{-6}$ to $1 \times 10^{-11}$ atm. The thickness of lubricant film is less than 1000 angstroms. To improve the adhesion and lubricating performance on the surface of a metallization or an electromechanical layer, phosphate esters may be chosen because of its affinity with the metallic surface.

Figure 18:
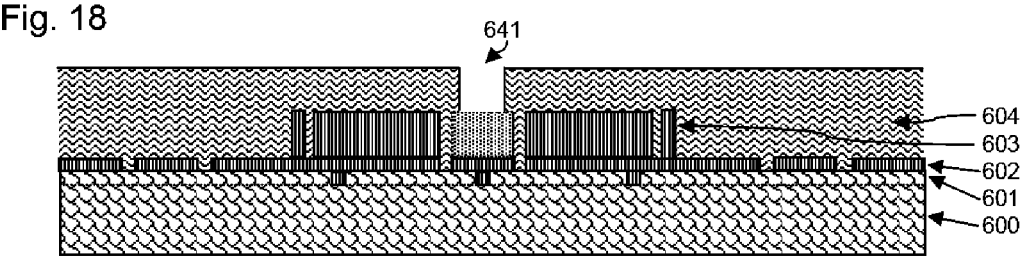
FIGS. 18-20 are cross section side views of a part of a spatial light modulator illustrating one method for fabricating a plurality of torsion hinges and its supports on the support frame.
Figure 19:
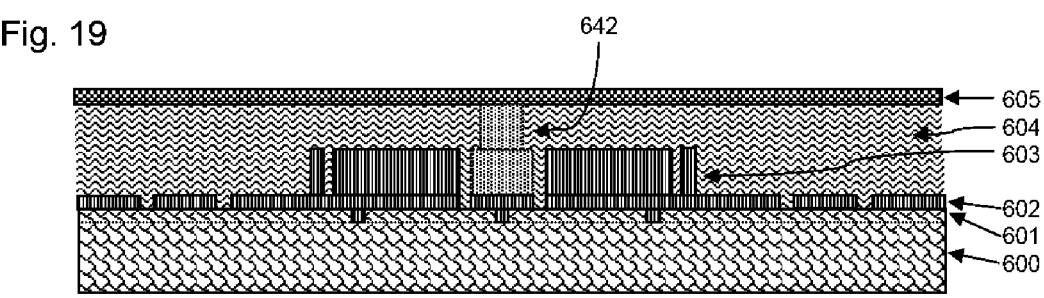
Figure 20:
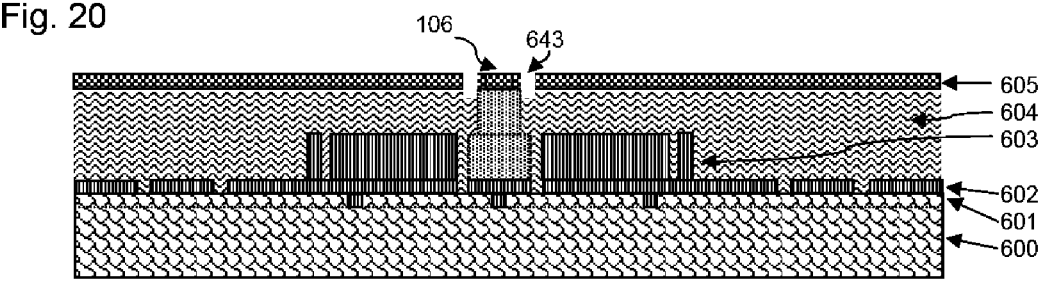
Figure 21:
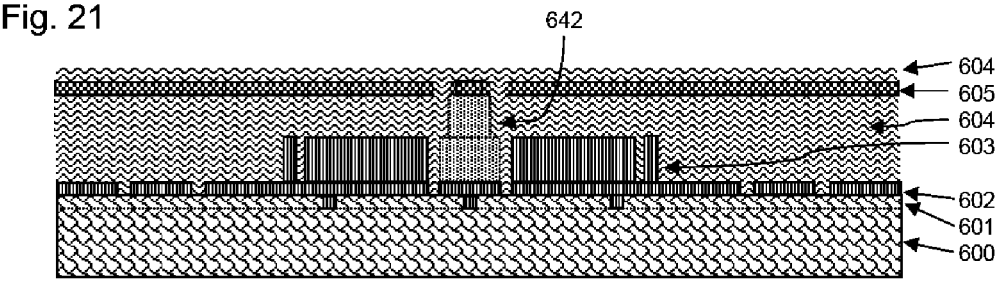
FIGS. 21-23 are cross section side views of a part of a spatial light modulator illustrating one method for fabricating a mirror plate with a plurality of hidden hinges.
Figure 22:
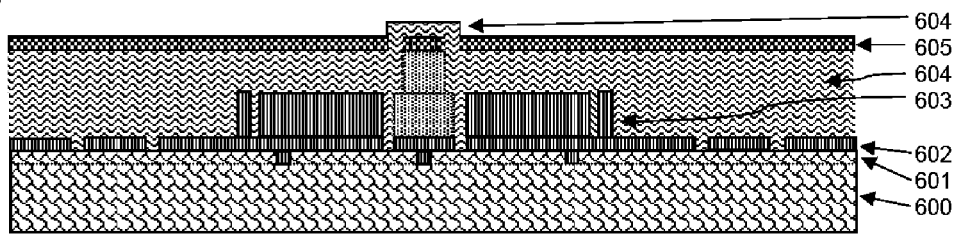
Figure 23:
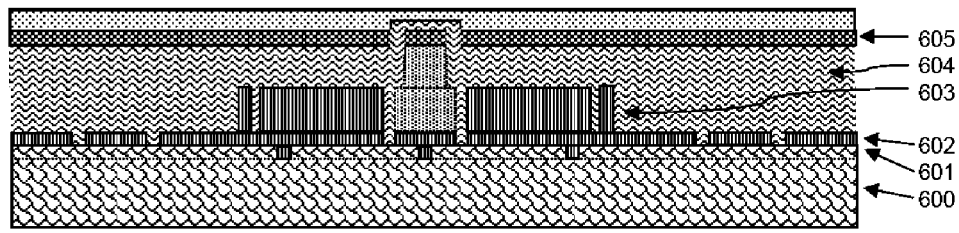

More detail description of each process to fabricate a high contrast spatial light modulator is illustrated in a series of cross section diagrams. FIG. 10 to FIG. 13 are cross section side views of a part of a spatial light modulator illustrating one method for fabricating a plurality of support frames and the first level electrodes connected to the memory cells in the addressing circuitry. FIG. 14 to FIG. 17 are cross section side views of a part of a spatial light modulator illustrating one method for fabricating a plurality of support posts, second level electrodes, and landing tips on the surface of control substrate. FIG. 18 to FIG. 20 are cross section side views of a part of a spatial light modulator illustrating one method for fabricating a plurality of torsion hinges and its supports on the support frame. FIG. 21 to FIG. 23 are cross section side views of a part of a spatial light modulator illustrating one method for fabricating a mirror plate with a plurality of hidden hinges. FIG. 23 to FIG. 26 are cross section side views of a part of a spatial light modulator illustrating one method for forming the reflective mirrors and releasing individual mirrors of a micro mirror array.

FIG. 10 is a cross sectional view that illustrates the control silicon wafer substrate 600 after using standard CMOS fabrication technology. In one embodiment, the control circuitry in the control substrate includes an array of memory cells, and word-line/bit-line interconnects for communication signals. There are many different methods to make electrical circuitry that performs the addressing function. The DRAM, SRAM, and latch devices commonly known may all perform the addressing function. Since the mirror plate 102 area may be relatively large on semiconductor scales (for example, the mirror plate 102 may have an area of larger then 100 square microns), complex circuitry can be manufactured beneath micro mirror 102. Possible circuitry includes, but is not limited to, storage buffers to store time sequential pixel information, and circuitry to perform pulse width modulation conversions.

In a typical CMOS fabrication process, the control silicon wafer substrate is covered with a passivation layer 601 such as silicon oxide or silicon nitride. The passivated control substrate 600 is patterned and etched anisotropically to form via 621 connected to the word-line/bit-line interconnects in the addressing circuitry, shown in FIG. 11. According to another embodiment, anisotropic etching of dielectric materials, such as silicon oxides or silicon nitrides, is accomplished with $C_2F_6$ and $CHF_3$ based feedstock and their mixtures with He and $O_2$. An exemplified high selectivity dielectric etching process includes the flow of $C_2F_6$, $CHF_3$, He, and $O_2$, gases (it a ratio of 10:10:5:2 mixtures at a total pressure of 100 mTorr with inductive source power of 1200 watts and a bias power 600 watts. The wafers are then cooled with a backside helium gas flow of 20 sccm at a pressure of 2 torr. A typical silicon oxides etch rate can reach 8000 angstroms per minute.

Next, FIG. 12 shows that an electromechanical layer 602 is deposited by PVD or PECVD depending on the electromechanical materials selected. This electromechanical layer 602 is patterned to define hinge support frames 202 and the first level electrodes 221 corresponding to each micro mirror 102, shown in FIG. 12. The patterning electromechanical layer 602 is performed by the following processes. First, a layer of photoresist is spin coated to cover the substrate surface. Then the photoresist layer is exposed to standard photolithography and developed to form predetermined patterns. The electromechanical layer is etched anisotropically through to form a plurality of via and openings. Once via and openings are formed, the partially fabricated wafer is cleaned by removing the residues from the surfaces and inside the openings. This is accomplished by exposing the patterned wafer to 2000 watts of RF or microwave plasma with 2 torr total pressures of a mixture of $O_2$, $CF_4$, and $H_2O$ gases at a ratio of 40:1:5 at about 250° C. temperatures for less than five minutes. Finally, the surfaces of electromechanical layer is passivated by exposing to a 2000 watts of RF or microwave plasma with 2 torr pressures of a 3000 sccm of $H_2O$ vapor at about 250° C. temperatures for less than three minutes.

Next step is forming a plurality of second level electrodes 221, landing tips 222a and 222b, and support pots 105 on the surface of partially fabricated wafer. A micron thick sacrificial material 604 is deposited on the substrate surface, which can be spin coated photoresist or PECVD of organic polymers, shown in FIG. 13. The sacrificial layer 604 is hardened by a series thermal and plasma treatments to transform structure of materials from a hydrophobic state to hydrophilic state of polymers. First, the sacrificial layer 604 is exposed to ultraviolet light, then to a $CF_4$ plasma for about three minutes, followed by baking sacrificial layer at about 150° C. for about two hours before exposing sacrificial layer to oxygen plasma for about one minute. In some case, implanting the sacrificial layer with KeV energy of silicon, boron, or phosphors ions further hardens the sacrificial layers 604.

Figure 15:
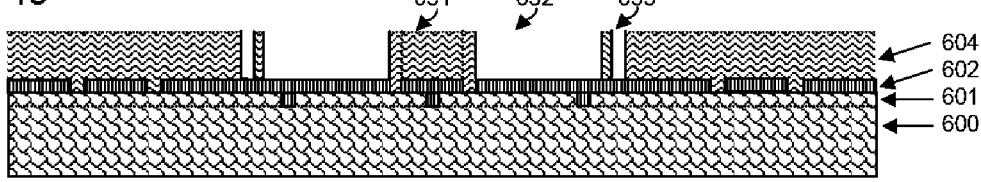
Figure 16:
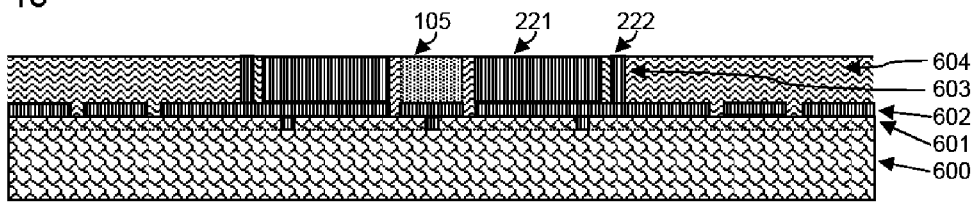

Then, sacrificial layer 604 is patterned to form a plurality of via and contact openings for second level electrodes 632, landing tips 633, and support pots 631 as shown in FIG. 15. To enhance the adhesion for subsequent electromechanical layer, the via and contact openings are exposed to a 2000 watts of RF or microwave plasma with 2 torr total pressures of a mixture of O2, CF4, and H2O gases at a ratio of 40:1:5 at about 250° C. temperatures for less than five minutes. Electromechanical material 603 is then deposited to fill via and contact openings. The filling is done by either PECVD or PVD depending on the materials selected. For the materials selected from the group consisting of aluminum, titanium, tungsten, molybdenum, their alloys, PVD is a common deposition method in the semiconductor industry. For the materials selected from the group consisting of silicon, polysilicon, silicide, polycide, tungsten, their combinations, PECVD is chosen as a method of deposition. The partially fabricated wafer is further planarized by CMP to a predetermined thickness slightly less than one micron shown in FIG. 16.

Figure 17:
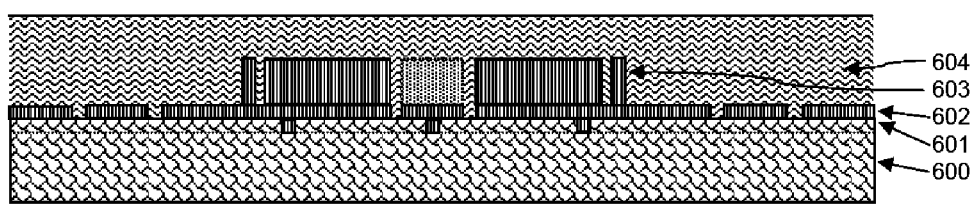

After the CMP planarization, FIG. 17 shows that another layer of sacrificial materials 604 is spin coated on the blanket surface to a predetermined thickness and hardened to form the air gap spacer under the torsion hinges. The sacrificial layer 604 is patterned to form a plurality of via or contact openings for hinge support posts 641 as shown in FIG. 18. In FIG. 19, electromechanical material is deposited to fill via and form a torsion hinge layer 605 on the surface. This hinge layer 605 is then planarized by CMP to a predetermined thickness. The thickness of electromechanical layer 605 formed here defines the thickness of torsion hinge bar and the mechanical performance of mirror later on.

The partially fabricated wafer is patterned and etched anisotropically to form a plurality of torsion hinges 106 in the electromechanical layers 605 as shown in FIG. 20. More sacrificial materials 604 is deposited to fill the openings 643 surrounding each hinges and to form a thin layer 604 with predetermined thickness on the surface, as shown in FIG. 21. The thickness of this layer 604 defines the height of the spacers on top of each torsion hinges 106. The sacrificial layer 604 is then patterned to form a plurality of spacers on top of each torsion hinges 106, as shown in FIG. 22. Since the top surfaces of support posts 642 are also under the cavities as lower part of the mirror plate 103, the air gap G in the cavity needs to be high enough to accommodate the angular rotation of mirror plate 103 without touching the larger hinge support posts 105 at a pre-determined angle θ. In order for the mirror to rotate predetermined angle θ without touching the hinge support post 105, the air gap of the cavities where torsion hinges 106 are positioned must be larger than G=0.5×W×SIN (θ), where W is the cross section width of hinge support posts 105. In the present invention, each mirror in the array may rotate 15° in each direction. The calculation indicates the air gap spacing G of torsion hinge 106 in the cavity must be larger than G=0.13 W. If Width of each side W of a square shape hinge support post 105 is 1.0 micron, the air gap spacing G in the cavity should be larger than 0.13 micron.

Figure 24:
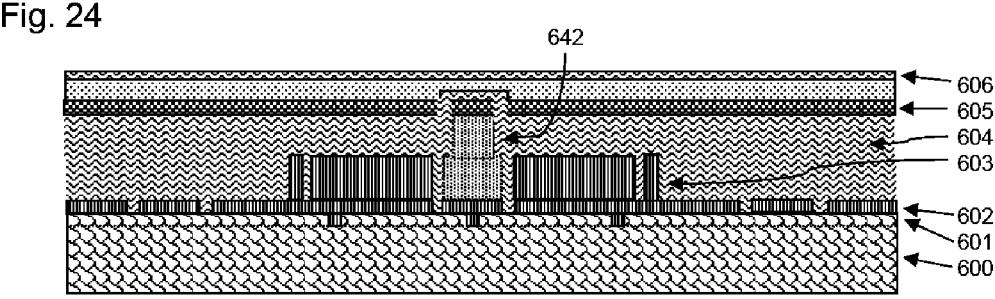
FIGS. 24-26 are cross section side views of a part of a spatial light modulator illustrating one method for forming the reflective mirrors and releasing individual mirrors of a micro mirror array.
Figure 25:
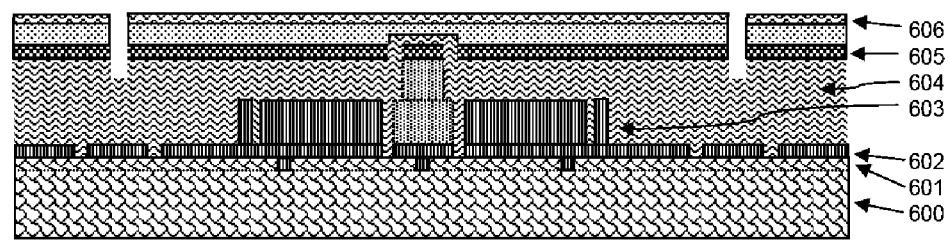

To form a mirror with torsion hinges 106 under each cavities in the lower portion of mirror plate 103, more electromechanical materials 605 is deposited to cover a plurality of sacrificial spacers, as shown in FIG. 23. In some cases, a chemical-mechanical-polished (CMP) process is added to ensure a flat reflective surface of electromechanical layer 605 has been achieved before etching to form individual mirrors. The thickness of the total electromechanical layer 605 will ultimately be the approximate thickness of the mirror plate 103 eventually fabricated. In FIG. 23, surface of partially fabricated wafer is planarized by CMP to a predetermined thickness of mirror plate 103. In present invention, the thickness of mirror plate 605 is between 0.3 micron to 0.5 micron. If the electromechanical material is aluminum or its metallic alloy, the reflectivity of mirror is high enough for most of display applications. For some other electromechanical materials or for other applications, reflectivity of mirror surface may be enhanced by deposition of a reflective layer 606 of 400 angstroms or less thickness selected from the group consisting of aluminum, gold, their alloys, and combinations, as shown in FIG. 24. The reflective surface 606 of electromechanical layer is then patterned and etched anisotropically through to form a plurality of individual mirrors, as shown in FIG. 25.

Figure 26:
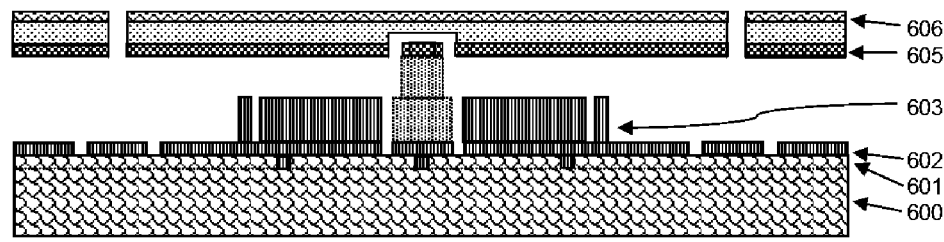

FIG. 26 shows the remaining sacrificial materials 604 are removed and residues are cleaned through a plurality of air gaps between each individual mirrors in the array to form a functional micro mirror array based spatial light modulator. In a real manufacturing environment, more processes are required before delivering a functional spatial light modulator for video display application. After reflective surface 606 of electromechanical layer 605 is patterned and etched anisotropically through to form a plurality of individual mirrors, more sacrificial materials 604 are deposited to cover the surface of fabricated wafer. With its surface protected by a layer of sacrificial layer 604, fabricated wafer is going through common semiconductor packaging processes to form individual device dies. In a packaging process, fabricated wafer is partially sawed (step 881) before separating into individual dies by scribing and breaking (step 882). The spatial light modulator device die is attached to the chip base with wire bonds and interconnects (step 883) before striping the remaining sacrificial materials 604 and its residues in the structures (step 884). The cleaning is accomplished by exposing the patterned wafer to a 2000 watts of RF or microwave plasma with 2 torr total pressures of a mixture of $O_2$, $CF_4$, and $H_2O$ gases at a ratio of 40:1:5 at about 250° C. temperatures for less than five minutes. Finally, the surfaces of electromechanical and metallization structures are passivated by exposing to a 2000 watts of RF or microwave plasma with 2 torr pressures of a 3000 sccm of $H_2O$ vapor at about 250° C. temperatures for less than three minutes.

The SLM device die is further coated an anti-stiction layer inside the opening structures by exposing to a PECVD of fluorocarbon at about 200° C. temperatures for less than five minutes (step 885) before plasma cleaning and electro-optical functional test (step 886). Finally, the SLM device is hermetically sealed with a glass window lip (step 887) and sent to burn-in process for reliability and robust quality control (step 888).

Although the invention has been particularly shown and described with reference to multiple embodiments, it will be understood by persons skilled in the relevant art that various changes in form and details can be made therein without departing from the spirit and scope of the invention. For example, the same 3-dimensional multi-layer structures may be constructed by patterning and etching the electromechanical layers, rather than patterning the sacrificial layers and etching via.

Figure 27:
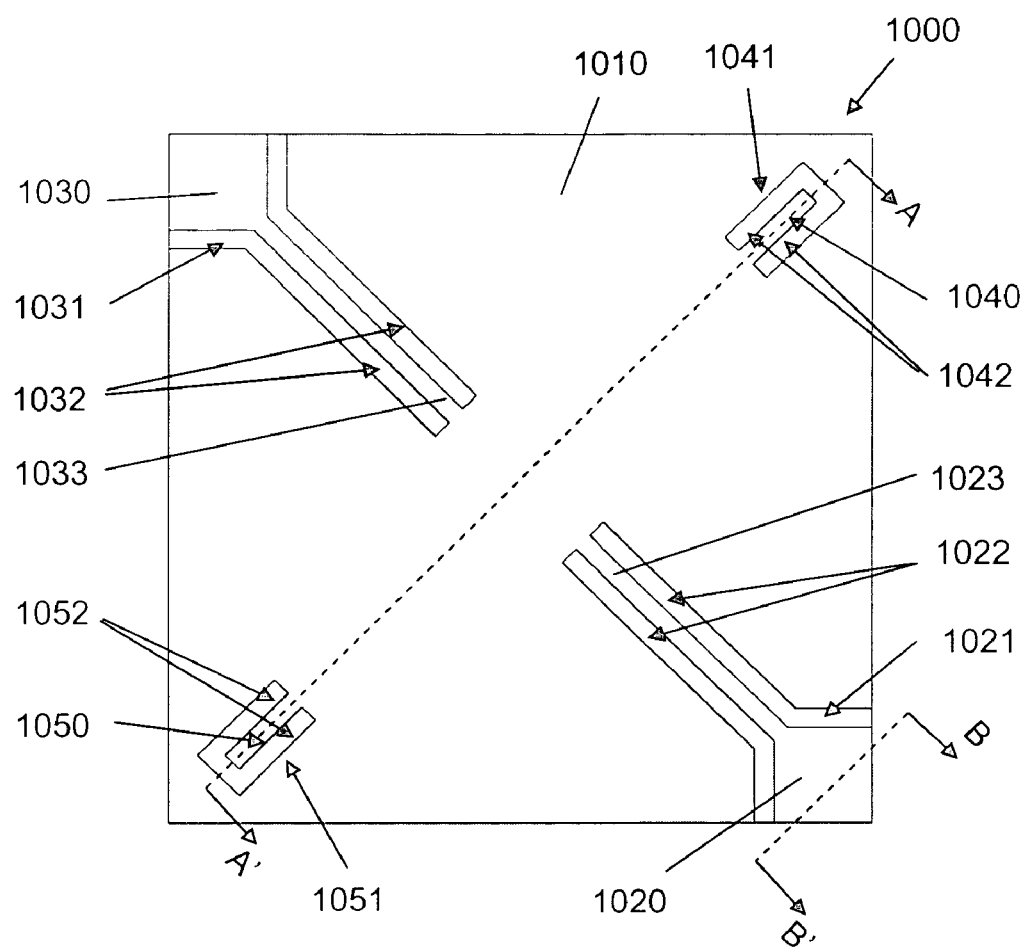
FIG. 27 is a bottom view of the micro-mirror plate having a cantilever anti-stiction mechanism in an embodiment of the present invention.
Figure 28:
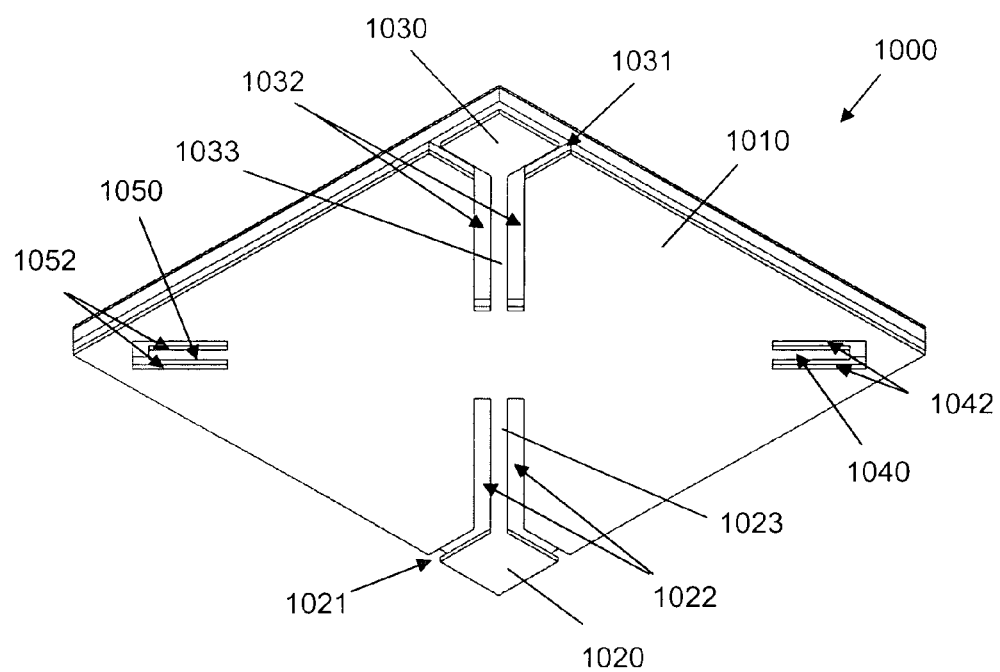
FIG. 28 is a lower perspective view of the micro-mirror plate having the cantilever anti-stiction mechanism in FIG. 27.

FIG. 27 is a bottom view of the micro-mirror plate 1000 having a cantilever anti-stiction mechanism across the lower surface 1010. FIG. 28 is a lower perspective view of the micro-mirror plate 1000. At least a portion of the lower surface 1010 is conductive. The conductive surface is connected to an electric circuit such that a electric potential difference can be established between the lower surface 1010 and an electrode over the control substrate. A pair of cavities 1021 and 1031 are fabricated in the underside of the micro-mirror plate 1000. A pair of torsional hinges 1020 and 1030 is respectively positioned inside the cavities 1020 and 1030, but not in contact with the inner walls of the cavities 1020 and 1030. The torsional hinges 1020 and 1030 are connected to the main body of the micro-mirror plate 1000 through the hinge bridges 1023 and 1033. Each of the torsional hinges 1020 and 1030 is also connected with a hinge support post that is joined to the control substrate.

The torsional hinge 1020 is separated from the walls of the cavity 1021 by air gaps to allow the mirror plate 1000 to tilt relative to the torsional hinge 1020. The elongated hinge bridge 1023 is connected with the torsional hinge 1020 at one end and the main body of the micro-mirror plate 1000 at the other. The side surfaces of the hinge bridge 1023 are separated from the main body of the micro-mirror plate 1000 by channels 1022 and an air gap over the top surface of the hinge bridge 1023. Similarly, the torsional hinge 1030 is separated from the walls of the cavity 1031 by air gaps. The elongated hinge bridge 1033 is connected with the torsional hinge 1030 at one end and the main body of the micro-mirror plate 1000 at the other. The side surfaces of the hinge bridge 1033 are separated from the main body of the micro-mirror plate 1000 by channels 1032 and an air gap over the top surface of the hinge bridge 1033.

The torsional hinges 1020 and 1030 are connected to hinge support posts joined to the control substrate. The micro-mirror plate 1000 can tilt around the diagonal axis defined by the two torsional hinges 1020 and 1030 when an appropriate electrostatic torque is applied to the micro-mirror plate 1000. The electrostatic torque can be induced by a voltage difference between an electrode over the control substrate and the conductive lower surface 1010 of the mirror plate 1000. The tilt of the micro-mirror plate 1000 produces torsional distortions in the elongated hinge bridges 1023 and 1033. The micro-mirror plate 1000 can be held at the two angular positions against the micro tips 222a and 222b by the electrically induced torques as shown in FIGS. 1a and 1b. The incident light waves can thus be reflected to two different directions by the reflective top surface of the micro-mirror 1000.

A challenge to the SLM devices is to overcome the contact stiction between the micro-mirror-plate and the substrate to allow fast response by the micro mirror. The contact stiction can be caused by Van der Waals force and capillary action force produced by the moisture trapped between the contacting surfaces. The contact stiction between the lower surface of the micro-mirror plate to the tip of the landing tips 222a and 222b can slow down the micro-mirror plate 1000 or prevent the micro-mirror plate from flipping to the next angular position.

To address the contact stiction problem, two cantilevers 1040 and 1050 are fabricated on the underside of the micro-mirror plate 1000. In one embodiment, the two cantilevers 1040 and 1050 are respectively situated under two cavities 1041 and 1051. The two cantilever 1040 or 1050 can be positioned to point to a corner or an edge of the micro-mirror plate 1000. The cavity 1041 has an opening 1042 on the underside of the micro-mirror plate 1000. The opening 1042 is partially covered by the overhanging cantilever 1040. Similarly, the cantilever 1050 overhangs the opening 1052 of the cavity 1051. The cantilevers 1040 and 1050 are positioned such that they can contact one of the landing tips 222a, 222b or 1240 (FIG. 29) to stop the tilt movement of the micro-mirror plate 1000.

The cavities 1041 and 1051 and the cantilevers 1040 and 1050 can be fabricated by the same processing steps as the cavities 1021 and 1031 and the torsional hinges 1020 and 1030. The cavities 1041 and 1051 can be formed by removing sacrificial materials that leaves air gaps besides and under the cantilevers 1040 and 1050. The sacrificial material can be a layer of photoresist material. The overhanging portions of the cantilevers 1040 and 1050 can be separated from mirror plate 1000 by removing the sacrificial materials through the openings 1042 and 1052.

In one embodiment, the layer of sacrificial material is patterned and deposited as the same layer as the sacrificial layer for forming the cavities 1021 and 1031 as previously described. The cantilevers 1040 and 1050 can be formed from the same layer of deposit material as the torsional hinges 1020 and 1030. The simultaneous formation of the anti-stiction cantilevers 1040 and 1050 and the torsional hinges 1020 and 1030 has the benefits of reducing manufacturing complexity and production cost, and increasing throughput.

The cantilevers 1040 and 1050 can comprise titanium, tantalum, tungsten, molybdenum, or an alloy or a silicide of these metals. The cantilevers 1040 and 1050 can also be made of silicon, amorphous silicon, polysilicon, or silicon nitride. In one embodiment, the cantilevers 1040 and 1050 can comprise substantially the same material compositions as the main body or the bottom layer of the micro-mirror plate 1000.

Figure 29:
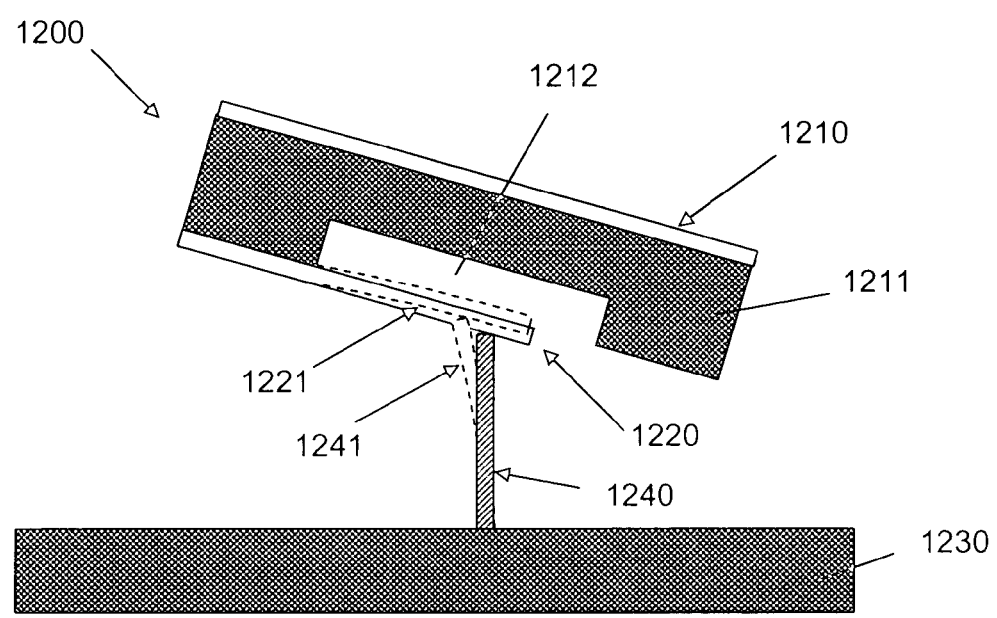
FIG. 29 is an enlarged cross-sectional view of a landing tip in contact with the cantilever on the micro-mirror plate of FIG. 27.

FIG. 29 shows an enlarged cross-sectional view of a micro-mirror plate 1200 along the line A-A' in FIG. 27. The micro-mirror plate 1200 includes a substrate portion 1211, a reflective top surface layer 1210, a cavity 1212, and a cantilever 1220 situated under the cavity 1212. The micro-mirror plate 1200 can be titled by a clockwise electrostatic torque. A landing tip 1240 is joined to the substrate 1230. The tilt of the micro-mirror plate 1200 is stopped when the cantilever 1220 comes to contact with the landing tip 1240. The downward electrostatic force exerted over the micro-mirror plate 1200 creates strains in both the cantilever 1220 and the landing tip 1240. As a result, the cantilever 1220 is distorted to the deformed cantilever positions 1221 (depicted by the dashed lines). The landing tip 1240 is bent to the distorted landing tip position 1241 (in dashed lines). The deformation of the cantilever 1220 stores mechanical potential energy in the cantilever 1220. The potential energy stored in the cantilever 1220 can be released to produce an elastic force pushing against the tip of the landing tip 1240 when the clockwise electrostatic torque is removed or reversed in its direction. Likewise, the bent landing tip 1240 can also spring back to push the micro-mirror plate 1200 when the driving electrostatic force is removed or reversed. The elastic repulsive forces from the release of mechanical potential energies help to overcome the stiction at the contact surfaces between the cantilever 1220 and the landing tip 1240, which enables a rapid separation between the landing tip 1240 and the cantilever 1220.

FIG. 30-35 illustrate the process for fabricating spatial light modulator having a mirror plate having a cantilever anti-stiction mechanism. The spatial light modulator is viewed in projections of two cross-sectional planes along the line A-A' and the line B-B' in FIG. 27 such the hidden hinge mechanism and the cantilever mechanism can be simultaneously illustrated in the same drawings. The processing steps depicted in FIG. 30-35 are similar to those shown in FIGS. 21-26 except for the additional anti-stiction cantilevers 1040 and 1050 over the cavities 1041 and 1051. Specifically, referring to FIG. 30, before the sacrificial material 604 is deposited over the hinge layer 605, openings 610a and 610b are patterned and etched in the hinge layer 605. The openings 610a and 610b also include openings on the two sides of the cantilevers 1040 and 1050, which are not visible in the projection cross-sectional view in FIG. 30. The sacrificial material 604 is deposited over the hinge layer 605 and to fill the openings 610a and 610b.

FIG. 31 shows that the sacrificial material 604 is then patterned and selected removed, leaving sacrificial material portions 604a and 604b in the openings 610a and 610b where the cavities 1041 and 1051 are to be formed. A portion of the sacrificial material is also kept over the cavity where the torsion hinge will be formed. An electromechanical layer 608 is subsequently deposited over the remaining sacrificial materials 604, 604a and 604b and the hinge layer 605, shown in FIG. 32. Two pockets 604a and 604b of sacrificial material are formed in the electromechanical layer 608 and the top surface of the torsion hinge layer 605.

Figure 33:
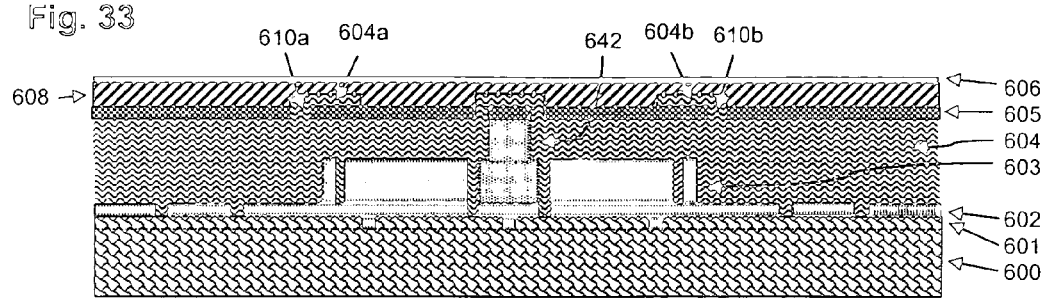
FIGS. 33-35 illustrate the process of forming a reflective mirror and the release of the mirror plate of FIG. 27.
Figure 34:
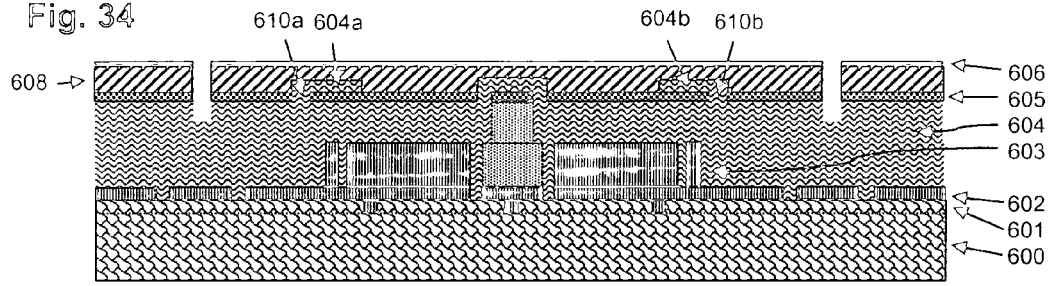
Figure 35:
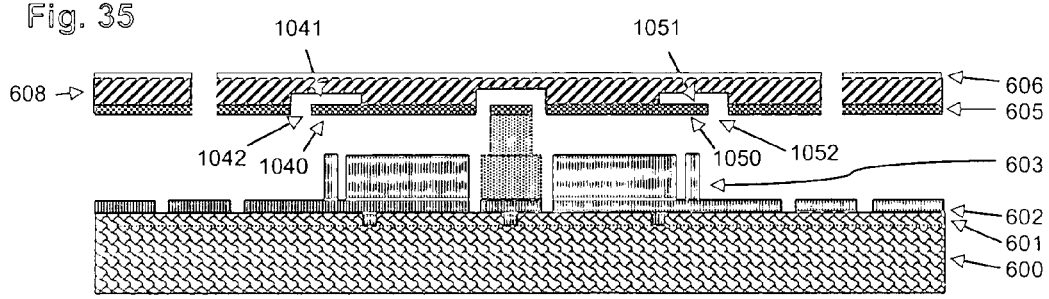

A reflective layer 606 is deposited over the electromechanical layer 608 in FIG. 33. The reflective layer 606 of electromechanical layer is then patterned. Apertures are etched anisotropically through the reflective layer 606, the electromechanical layer 608, and the torsion hinge layer 605 into the sacrificial layer 604 to define the separation between adjacent individual mirrors, as shown in FIG. 34. The sacrificial materials are removed through the apertures in FIG. 35. Cavities 1041 and 1051 are formed in the electromechanical layer 608 by removing sacrificial materials through the openings 1042 and 1052. The cantilevers 1040 and 1050 are formed in the same process so as to be situated under the cavities 1041 and 1051.

Figure 36:
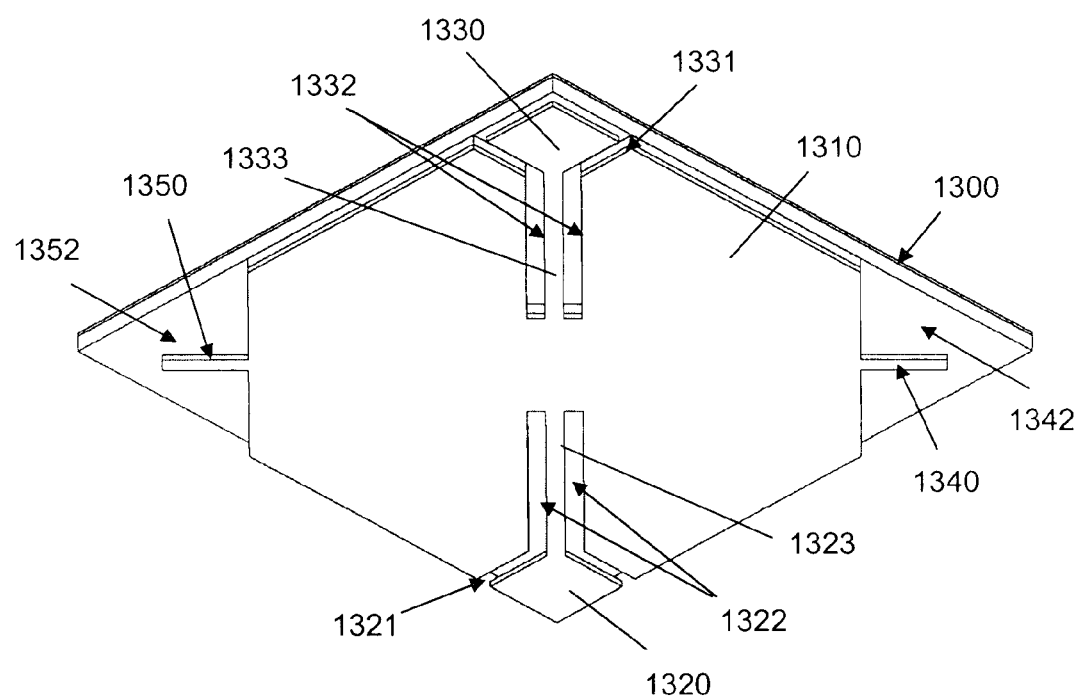
FIG. 36 is a bottom view of the micro-mirror plate having a cantilever anti-stiction mechanism in another embodiment of the present invention.
Figure 37:
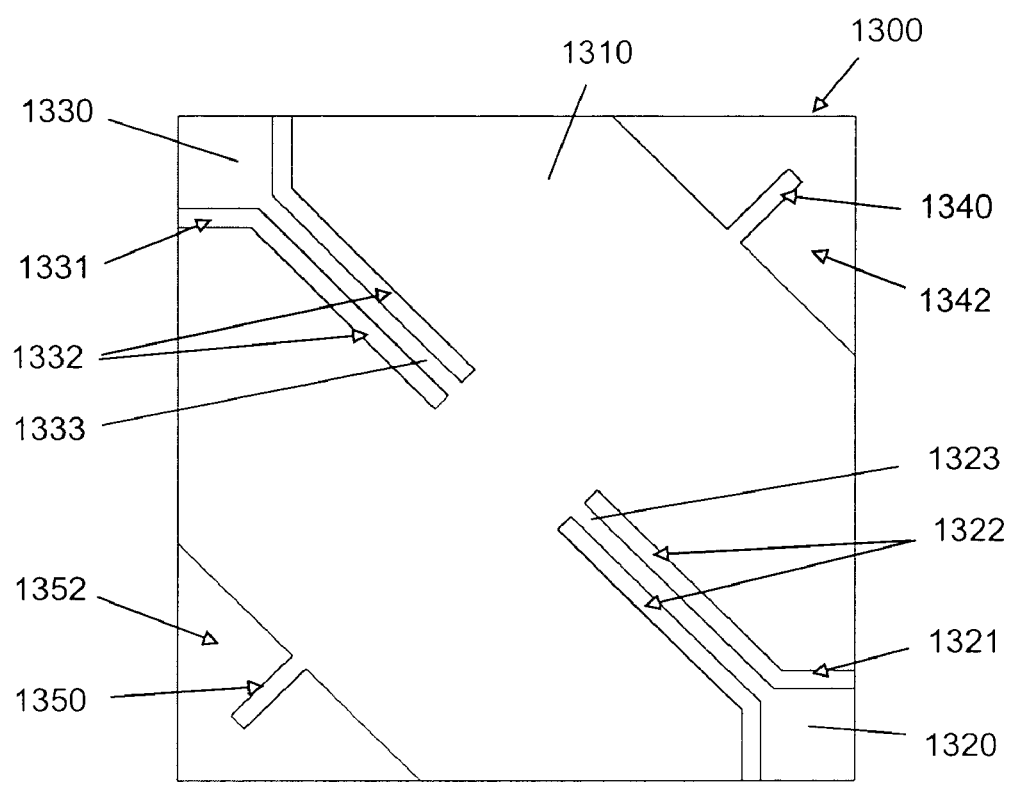
FIG. 37 is a lower perspective view of the micro-mirror plate of FIG. 36.

In another embodiment, as shown in FIG. 36 and FIG. 37, the antistiction cantilevers 1340 and 1350 can overhang recesses 1342 and 1352 in the lower surface 1310 of the micro-mirror plate 1300 instead of over a cavity in the lower surface of the micro-mirror plate. Similar to the configurations shown in FIGS. 27 and 28, the cantilevers 1340 and 1350 are oriented pointing to the corners of the micro-mirror plate 1300 such that the spring-back motion of the cantilevers 1340 and 1350 can produce the largest angular momentum for the separation of the cantilever and the landing tip.

The recesses 1342 and 1352 and the cantilevers 1340 and 1350 can be fabricated by the same processing steps as the cavities 1321 and 1331 and the torsional hinges 1320 and 1330. The recesses 1342 and 1352 can be formed by removing sacrificial materials to form air gaps besides and under the cantilevers 1340 and 1350. The sacrificial material such as a photoresist material can be directly removed from the edges of the micro-mirror plate 1300 instead of through openings to the cavities. The removal of the sacrificial materials can be more efficient since there is more access to the recesses 1342 and 1352. The layer of sacrificial material is patterned and deposited as the same layer as the sacrificial layer for forming the cavities 1321 and 1331.

A pair of cavities 1321 and 1331 are fabricated in the underside of the micro-mirror plate 1300. A pair of torsional hinges 1320 and 1330 are respectively positioned inside the cavities 1320 and 1330, but not in contact with the inner walls of the cavities 1320 and 1330. The torsional hinges 1320 and 1330 are connected to the main body of the micro-mirror plate 1300 through the hinge bridges 1323 and 1333. Each of the torsional hinges 1320 and 1330 is also connected with a hinge support post that is joined to the control substrate. The torsional hinge 1320 is separated from the walls of the cavity 1321 by air gaps to allow the mirror plate 1300 to tilt relative to the torsional hinge 1320. The elongated hinge bridge 1323 is connected with the torsional hinge 1320 at one end and the main body of the micro-mirror plate 1300 at the other. The side surfaces of the hinge bridge 1323 are separated from the main body of the micro-mirror plate 1300 by channels 1322 and an air gap over the top surface of the hinge bridge 1323. Similarly, the torsional hinge 1330 is separated from the walls of the cavity 1331 by air gaps. The elongated hinge bridge 1333 is connected with the torsional hinge 1330 at one end and the main body of the micro-mirror plate 1300 at the other. The side surfaces of the hinge bridge 1333 are separated from the main body of the micro-mirror plate 1300 by channels 1332 and an air gap over the top surface of the hinge bridge 1333.

The cantilevers 1340 and 1350 can be formed from the same layer of deposit material as the torsional hinges 1320 and 1330. The simultaneous formation of the anti-stiction cantilevers 1340 and 1350 and the torsional hinges 1320 and 1330 has the benefits of reducing manufacturing complexity and production cost, and increasing throughput. The cantilevers 1340 and 1350 can comprise titanium, tantalum, tungsten, molybdenum, or an alloy or a silicide of these metals. The cantilevers 1340 and 1350 can also be made of silicon, amorphous silicon, polysilicon, or silicon nitride. In one embodiment, the cantilevers 1340 and 1350 can comprise substantially the same material compositions as the main body or the bottom layer of the micro-mirror plate 1300.

The disclosed SLM device can include a single landing tip joined to the substrate for stopping the rotation of a mirror plate. The mirror plate can include a cavity and a cantilever over the cavity on the lower side of the mirror plate. As described above, the cantilever can come to contact with the landing tip to stop the rotation of the mirror plate, when the mirror plate is rotated by an electrostatic force toward the landing plate. The orientation of the mirror plate at which the cantilever is in contact with the landing tip defines one angular position of the mirror plate for light modulation. The contact between the landing tip and the cantilever stores elastic energies in the deformed cantilever and the bent landing tip. The releases of the elastic forces help to overcome the contact stiction between the landing tip and the mirror plate when the mirror plate is rotated away from the landing tip by another electrostatic force. The mirror can be tilted to the horizontal direction or another angular direction, which defines a second state of light modulation by the mirror plate.

Figure 38A:
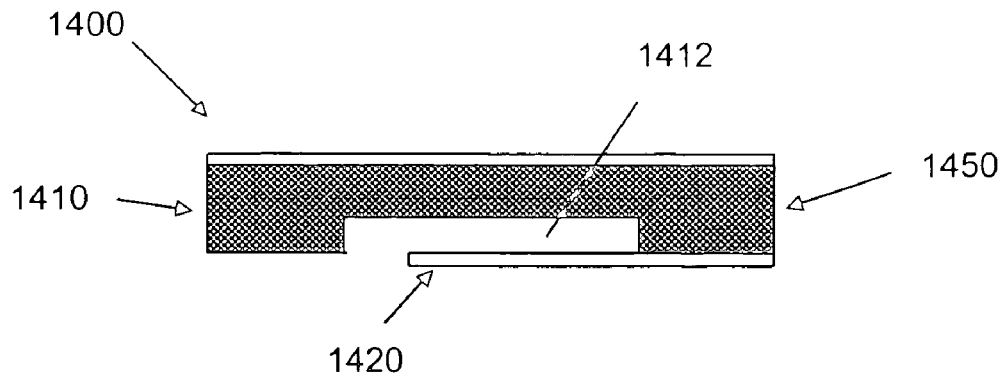
FIGS. 38A-38C show cross-sectional views of several embodiments of the cantilever designs.
Figure 38B:
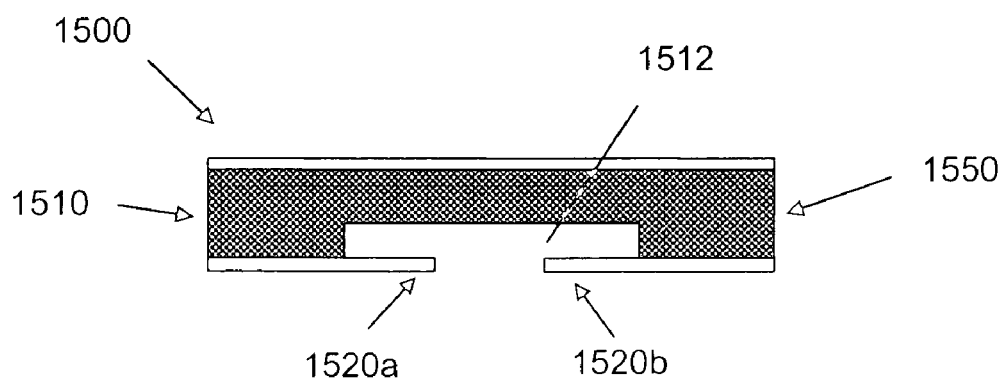
Figure 38C:
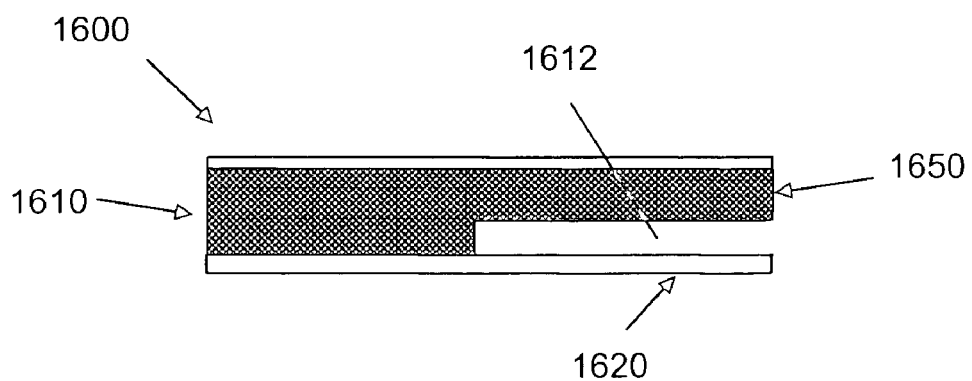

FIGS. 38A-38C show cross-sectional views of several embodiments of the cantilever designs. FIG. 38A shows the portion of a micro mirror 1400 near its outer edge 1450. The micro mirror 1400 includes a mirror plate 1410 and a cavity 1412. A cantilever 1420 connected to the mirror plate 1410 is situated under the cavity 1412 with the tip of the cantilever 1420 away from the outer edge 1450. FIG. 38B shows the portion of a micro mirror 1500. The micro mirror 1500 includes a mirror plate 1510, a cavity 1512, and an outer edge 1550. Two cantilevers 1520a and 1520b in connection with the mirror plate 1510 are situated under the cavity 1512. The tips of the cantilevers 1520a and 1520b can be opposite to each other. FIG. 38C shows the portion of a micro mirror 1600 near its outer edge 1650. The micro mirror 1600 includes a mirror plate 1610 and a slot 1612. A cantilever 1620 in connection with the mirror plate 1610 is situated under the slot 1610.

It is understood that the disclosed systems and methods are compatible with other configurations of cantilever in a spatial light modulator comprising a tiltable mirror plate. The cantilever is connected with the main body of the mirror plate. The cantilever can be disposed at any position over the mirror plate that allows the cantilever to be the only contact point that touches an object over the substrate to stop the tilt movement of the mirror plate. The cantilever can be on the underside of the mirror plate or extending out of the edges of the mirror plate. The cantilever can optionally stops the tilt movement of the mirror plate in conjunction with a landing tip over the substrate. The cantilever can also be oriented pointing to different positions of the mirror plate including, for example, a corner, an edge, or the center of the mirror plate. He cantilever can be aligned along the edge, the diagonal lines, or other orientations relative to the mirror plate. The cantilever can be substantially parallel or tilted relative to the lower surface of the mirror plate.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A spatial light modulator, comprising:
   a mirror plate comprising a reflective upper surface, a lower surface having a recess in the lower surface, a first cavity having an opening on the lower surface, and a cantilever situated under the recess and connected with the lower surface of the mirror plate, wherein the mirror plate is configured to tilt around a hinge component extending into the first cavity, the hinge component being supported by a stationary substrate, and wherein the tilt movement of the mirror plate can be stopped when the cantilever comes into contact with a stationary object.

2. The spatial light modulator of claim 1, wherein the recess forms a second cavity having an opening in the lower surface of the mirror plate.

3. The spatial light modulator of claim 1, wherein the recess is located at a corner of the lower surface of the mirror plate.

4. The spatial light modulator of claim 1, wherein the mirror plate comprises two or more cantilevers each configured to come into contact with the stationary object to stop the tilt movement of the mirror plate at a predetermined orientation.

5. The spatial light modulator of claim 1, wherein the cantilever is substantially parallel to the lower surface of the mirror plate.

6. The spatial light modulator of claim 1, wherein the cantilever is oriented pointing to a corner or an edge of the mirror plate.

7. The spatial light modulator of claim 1, wherein the stationary substrate comprises an upper surface, a hinge support post in connection with the upper surface, and the hinge component in connection with the hinge support post and the mirror plate.

8. The spatial light modulator of claim 7, wherein a gap is formed between the surfaces in the first cavity and the hinge component to permit the tilt movement of the mirror plate.

9. The spatial light modulator of claim 7, further comprising:
an electrode over the upper surface of the stationary substrate; and
a conductive surface portion in the lower surface of the mirror plate.

10. The spatial light modulator of claim 9, wherein the mirror plate is configured to tilt when an electric voltage is applied between the electrode over the stationary substrate and the conductive surface portion in the lower surface of the mirror plate.

11. The spatial light modulator of claim 10, wherein the cantilever can be deformed by the stationary object when the rotation of the mirror plate is stopped by the contact between the cantilever and the stationary object.

12. The spatial light modulator of claim 11, wherein the deformed cantilever is configured to produce an elastic force pushing against the stationary object.

13. The spatial light modulator of claim 1, wherein the stationary object is connected with the stationary substrate.

14. The spatial light modulator of claim 1, wherein the cantilever is the only portion on the mirror plate that can come into contact with the stationary object.

15. The spatial light modulator of claim 1, wherein the cantilever comprises a material selected from the group consisting of titanium, tantalum, tungsten, molybdenum, an alloy, silicon, amorphous silicon, polysilicon, and a silicide.

16. The spatial light modulator of claim 1, wherein the cantilever and the hinge component comprise substantially the same material composition.

17. The spatial light modulator of claim 16, wherein the cantilever and the hinge component comprise a different material composition from the material composition in the main body of the mirror plate.

18. The spatial light modulator of claim 1, wherein the cantilever composes substantially the same material as the main body of the mirror plate.

19. A spatial light modulator, comprising:
a mirror plate comprising a reflective upper surface, a lower surface having a recess in the lower surface, a first cavity having an opening on the lower surface, and a cantilever situated under the recess and connected with the lower surface of the mirror plate, wherein the mirror plate is configured to tilt around a hinge component extending into the first cavity;
a substrate comprising an upper surface, a hinge support post in connection with the upper surface, and the hinge component in connection with the hinge support post and the mirror plate; and
a landing tip in connection with the upper surface of the substrate, wherein the tilt movement of the mirror plate can be stopped when the cantilever comes into contact with a landing tip.

20. The spatial light modulator of claim 19, wherein the recess forms a second cavity having an opening in the lower surface of the mirror plate.

21. The spatial light modulator of claim 19, wherein the recess is located at a corner of the lower surface of the mirror plate.

22. The spatial light modulator of claim 19, wherein the cantilever is substantially parallel to the lower surface of the mirror plate.

23. The spatial light modulator of claim 19, wherein the cantilever is oriented pointing to a corner or an edge of the mirror plate.

24. The spatial light modulator of claim 19, wherein a gap is formed between the surfaces in the first cavity and the associated hinge component to permit the tilt movement of the mirror plate.

25. The spatial light modulator of claim 19, further comprising:
an electrode over the upper surface of the substrate; and
a conductive surface portion in the lower surface of the mirror plate.

26. The spatial light modulator of claim 25, wherein the mirror plate is configured to tilt when an electric voltage is applied between the electrode over the substrate and the conductive surface portion in the lower surface of the mirror plate.

27. The spatial light modulator of claim 26, wherein the cantilever can be deformed by the landing tip when the tilt movement of the mirror plate is stopped by the contact between the cantilever and the landing tip.

28. The spatial light modulator of claim 27, wherein the deformed cantilever is configured to produce an elastic force pushing against the landing tip.

29. The spatial light modulator of claim 19, wherein the cantilever comprises a material selected from the group consisting of titanium, tantalum, tungsten, molybdenum, an alloy, silicon, amorphous silicon, polysilicon, and a silicide.

30. The spatial light modulator of claim 19, wherein the cantilever and the hinge component comprise substantially the same material composition.

31. The spatial light modulator of claim 19, wherein the cantilever and the hinge component comprise a different material composition from the material composition in the main body of the mirror plate.

32. The spatial light modulator of claim 19, wherein the cantilever is the only portion on the mirror plate that can come into contact with the landing tip.

33. A method of fabricating a spatial light modulator, the method comprising:
forming a substrate comprising an upper surface, a hinge support post in connection with the upper surface, a hinge component in connection with the hinge support post, and a landing tip in connection with the upper surface; and
forming a the-mirror plate in connection with the hinge component, comprising a reflective upper surface, a lower surface having a recess in the lower surface, a first cavity having an opening in the lower surface, and a cantilever situated under the recess and connected with the lower surface of the mirror plate, wherein the hinge component extends into the first cavity to permit the mirror plate to tilt around the hinge component, and wherein the cantilever can stop the tilt movement of the mirror plate by coming into contact with the landing tip.

34. The method of claim 33, wherein the recess forms a second cavity having an opening in the lower surface of the mirror plate.

35. The method of claim 33, wherein the recess is at a corner
of the lower surface of the mirror plate.

36. The method of claim 33, wherein the cantilever is substantially parallel to the lower surface of the mirror plate.

37. The method of claim 33, wherein the cantilever is oriented pointing to a corner or an edge of the mirror plate.

38. The method of claim 33, wherein the recess is located at or near a corner or an edge of the mirror plate.

* * * * *

UNITED STATES PATENT AND TRADEMARK OFFICE
CERTIFICATE OF CORRECTION

PATENT NO. : 7,405,862 B2
APPLICATION NO. : 11/366195
DATED : July 29, 2008
INVENTOR(S) : Shaoher X. Pan and Vlad Novotny It is certified that error appears in the above-identified patent and that said Letters Patent is hereby corrected as shown below:

On the Cover Page, (57) Abstract, Line 2; replace:
"a reflective upper surface, a louver surface have a recess in" with
-- a reflective upper surface, a lower surface have a recess in --

Column 5, Line 49; replace:
"tial established by the bipolar bias vb enhances the electro-" with
-- tial established by the bipolar bias Vb enhances the electro --

Column 5, Line 54; replace:
"103b and 103c have less impact on which direction the mirror" with
-- 103b and 103c) have less impact on which direction the mirror --

Column 5, Line 56; replace:
"F on the whole mirror plate 102 provides a dynamic excitation" with
-- F on the whole mirror plate 103 provides a dynamic excitation --

Column 5, Line 60; replace:
"is released on the common bias vb, the elastic strain energy of" with
-- is released on the common bias Vb, the elastic strain energy of --

Column 6, Lines 24-34; replace:
"time. plate 103 is fabricated to be part of the mirror plate 103 and are kept in a minimum distance under the reflective surface to allow only a gap for a predetermined angular rotation. By minimizing the distances between a hinge rotating axes 106 to the upper reflective surfaces 102, the spatial light modulator effectively eliminates the horizontal displacement of each mirror during an angular transition. According to the present invention, the gaps between adjacent mirrors in the array of SLM can be reduced to less than 0.2 microns to achieve the highest active reflection area fill-ratio of a micro mirror array at the present time." with
-- time. --

Column 6, Line 56; replace:
"According, to an alternative embodiment, the materials of" with
-- According to an alternative embodiment, the materials of --

UNITED STATES PATENT AND TRADEMARK OFFICE
CERTIFICATE OF CORRECTION

PATENT NO.        : 7,405,862 B2
APPLICATION NO.   : 11/366195
DATED             : July 29, 2008
INVENTOR(S)       : Shaoher X. Pan and Vlad Novotny It is certified that error appears in the above-identified patent and that said Letters Patent is hereby corrected as shown below:

Column 7, Line 47; replace:
"electrostatic efficiently of the capacitive coupling to the mir-" with
-- electrostatic efficiency of the capacitive coupling to the mir- --

Column 13, Line 43; replace:
"includes the flow of $C_2F_6$, $CHF_3$, He, and $O_2$, gases (it a ratio" with
-- includes the flow of $C_2F_6$, $CHF_3$, He, and $O_2$, gases (at a ratio --

Column 15, Line 5; replace:
"than G=0.13 W. If Width of each side W of a square shape" with
-- than G=0.13 W. If width of each side W of a square shape --

Column 21, Line 61 at Claim 18; replace:
"cantilever composes substantially the same material as the" with
-- cantilever comprises substantially the same material as the --

Column 22, Line 66 at Claim 31; replace:
"forming a the-mirror plate in connection with the hinge" with
-- forming a mirror plate in connection with the hinge --

Signed and Sealed this

Twentieth Day of January, 2009

JON W. DUDAS
*Director of the United States Patent and Trademark Office*